US008572558B1

(12) United States Patent
Mathieu, III et al.

(10) Patent No.: US 8,572,558 B1
(45) Date of Patent: Oct. 29, 2013

(54) SHELL ARCHITECTURE SOFTWARE DEVELOPMENT

(75) Inventors: Rudy Mathieu, III, Apache Junction, AZ (US); Keith Weiner, Queen Creek, AZ (US)

(73) Assignee: Avaya Inc., Basking Ridge, NJ (US)

( * ) Notice: Subject to any disclaimer, the term of this patent is extended or adjusted under 35 U.S.C. 154(b) by 1805 days.

(21) Appl. No.: 11/903,155

(22) Filed: Sep. 19, 2007

Related U.S. Application Data

(60) Provisional application No. 60/845,888, filed on Sep. 19, 2006.

(51) Int. Cl.
*G06F 9/44* (2006.01)
(52) U.S. Cl.
USPC .......................................................... 717/107

(58) Field of Classification Search
None
See application file for complete search history.

(56) References Cited

U.S. PATENT DOCUMENTS

2006/0143220 A1* 6/2006 Spencer, Jr. .................. 707/102
2007/0234271 A1* 10/2007 Winkler et al. ............... 717/100

* cited by examiner

*Primary Examiner* — Don Wong
*Assistant Examiner* — Deric Ortiz
(74) *Attorney, Agent, or Firm* — Withrow & Terranova, PLLC

(57) ABSTRACT

A programming interface and infrastructure of the present invention includes a Shell programming interface and infrastructure (Shell construct), at least one Logic construct, and at least one Data construct. A method for programming using at least one Shell construct, at least one Data construct, at least one I/O construct, and at least one Logic construct. In this method, the at least one Logic construct is independent from the at least one I/O construct.

10 Claims, 7 Drawing Sheets

Shell Framework Simplified

SHELL ARCHITECTURE SOFTWARE DEVELOPMENT

The present application is an application claiming the benefit under 35 USC Section 119(e) of U.S. Provisional Patent Application Ser. No. 60/845,888, filed Sep. 19, 2006. The present application is based on and claims priority from this application, the disclosure of which is hereby expressly incorporated herein by reference in its entirety.

COPYRIGHT NOTICE

A portion of the disclosure of this patent document contains material that is subject to copyright protection. The copyright owner has no objection to the facsimile reproduction of the patent disclosure, as it appears in the Patent and Trademark Office patent files or records, but otherwise reserves all copyright rights whatsoever.

REFERENCE TO A COMPUTER PROGRAM

A computer program listing Appendix A is submitted on a compact disc and the material (including AppendixA.txt that contains the following software components: cmdproc.c, cmdproc.h, ctl.c, ctl.h, data.c, data.h, family.c, family.h, feature.c, feature.h, shcmd.c, shcmd.h, shell.c, and shell.h) on the compact disc is herein incorporated by reference.

The single compact disc (submitted in duplicate) includes a single file (AppendixA.txt, Sep. 19, 2006, 272 KB) with portions of an exemplary computer code implementing one preferred embodiment of the present invention.

BACKGROUND OF INVENTION

The present invention is directed to a new architecture for software development, and more specifically to Shell architecture for software development in which the development of Logic is entirely separated from the development of Graphical User Interface (GUI).

Computer programs that interact with external resources have three constructs: Logic, Data, and Input/Output.

Logic is defined as the computer instructions that perform the desired task: for example, calculating the best move in a tic-tac-toe game application or determining illegal moves in a tic-tac-toe game application. Another example would be the process of making a connection between the "caller" and "callee" of a phone call.

Data is defined as a distinct piece of information: for example, an "X" or an "O" played in a tic-tac-toe board cell. Another example would be a telephone number that a user ("caller") is trying to call.

Input/Output or (I/O) is defined as the mechanism for externally influencing and expressing a computer program: for example, the part that shows the tic-tac-toe board and allows a user to select a tic-tac-toe board cell. Another example would be the buttons and displays of the telephone. A Graphical User Interface (GUI) is defined as an I/O construct or unit that works via interactive display of information (including the Data defined above). The terms GUI and I/O are used substantially interchangeably throughout this application, although a GUI is just one type of I/O.

Legacy Software Application Paradigm

Early software developmental paradigms intermingle the Logic, Data, and I/O constructs. In other words, programmers programmed Logic, Data, and I/O altogether in one application. This was extremely inefficient. Further, it was extremely difficult for multiple programmers to work on a single application using this legacy paradigm. Still further, intermingling Logic, Data, and I/O in software development is considered non-viable today because software is simply too complex for a developer/programmer to be completely versed in the Logic, Data, and I/O constructs.

Typical Software Application Paradigm

Typical software developmental paradigms and many typical software applications (e.g. WINDOWS® and MAC®) use the Logic construct as a functional intermediary between the Data construct and the I/O construct. In this paradigm, as depicted in FIG. 1, Logic 10 is the key link between managing Data 12 and I/O 14. This paradigm was introduced as a basic programming architecture for the modern operating system. However, the developer/programmer of the Logic construct must not only have technical knowledge of the specific problem being solved, but also an equal technical knowledge of all aspects of the I/O construct.

Application Frameworks Paradigm

The next evolutionary stage of software developmental paradigms was the use of Application Frameworks 20 as shown in FIG. 2. This paradigm is very similar to the paradigm shown in FIG. 1, except that an Application Framework 20 is used to wrap the GUI 22 underneath. The Application Framework 20 can help with the automation of programming. As shown, Logic 26 remains the key link between managing Data 24 and the Application Framework 20.

The Application Framework 20 paradigm aids in the complexity of dealing with the proliferation of platforms because the Application Framework 20 will work with multiple platforms. In other words, using the Application Framework 20 paradigm, the programming may become portable over multiple platforms.

The Application Frameworks 20 paradigm, however, only replaces the need for technical knowledge of both the Logic 26 and the I/O 22 (as with the paradigm shown in FIG. 1) with the need for technical knowledge of both the Logic 26 and the Application Framework 20. In other words, the developer/programmer of the Logic construct must not only have technical knowledge of the specific problem being solved, but also an equal technical knowledge of all aspects of the Application Framework 20.

Model View Controller Architecture Paradigm

With the advent of Object Oriented Programming (OOP), the next paradigm came into fashion. In this paradigm, the Data and that part of the Logic that gives the Data domain-specific meaning were merged into an object known as the Model 32. The Graphical User Interface (GUI) module was split into two objects—the Controller 30 and the View 34. These objects have the following responsibilities:

Model 32 (FIG. 3)—The model object gives high-level meaning to the Data on which an operation is being performed. The Data is abstracted into domain-specific information, and can perform operations (e.g. "compute total taxes" or "enumerate shopping cart contents").

View 34 (FIG. 3)—The view object renders the model into something with which the user can interact (e.g. a window, a filled-out form, a web page, etc.)

Controller 30 (FIG. 3)—The controller object processes events, generally in response to user actions, and updates the Model 32 accordingly. The controller object can also indirectly make changes to the View 34 (e.g. requesting a refresh).

The primary advantage of this paradigm is encapsulation; modifications to one object component typically have a minimal impact on the other object components. The disadvantages are additional complexity and computational inefficiency. Additionally, interfaces between these object components are typically very wide (i.e. contain numerous functions and message types), and considerable up-front design must take place before development of the three object components can begin in parallel.

BRIEF SUMMARY OF THE INVENTION

The present invention is directed to a new architecture for software development, and more specifically to a Shell architecture for software development. The Shell provides the programming interface and infrastructure that manages, and communicates bi-directionally with, Logic, GUI or I/O, and External (Ext) or Simulated Sources. The Shell 100 is able to look at the Data Descriptor 110 to assist in the management (e.g. signal flow and notification paths) of notification messages pertaining to the Data 104.

A programming interface and infrastructure of the present invention includes a Shell programming interface and infrastructure (Shell construct), at least one Logic construct, and at least one Data construct. The Shell construct manages computer programming constructs. The Shell construct communicates bi-directionally with the at least one Logic construct. The Shell construct assists in the management of notification messages pertaining to the at least one Data construct. An optional embodiment of the present invention further includes at least one I/O construct, the Shell construct communicating bi-directionally with the at least one I/O construct.

In a first preferred embodiment of the present invention, the at least one Data construct is accessed or modified directly by the at least one Logic construct, and the Shell construct is sent a notification message pertaining to the access or modification of the at least one Data construct. In a second preferred embodiment of the present invention, the Data construct is accessed or modified indirectly by sending a message to the Shell programming interface and infrastructure requesting that the Shell programming interface and infrastructure access or modify the at least one Data construct.

A separate preferred embodiment of the present invention is directed to a method for programming using at least one Shell construct, at least one Data construct, at least one I/O construct, and at least one Logic construct. In this method, the at least one Logic construct is independent from the at least one I/O construct.

The foregoing and other objectives, features, and advantages of the invention will be more readily understood upon consideration of the following detailed description of the invention, taken in conjunction with the accompanying drawings.

DETAILED DESCRIPTION OF THE INVENTION

Today, virtually all software applications that run on general-purpose computers use one of the paradigms described in the Background section of this specification. At best, these known paradigms have had limited success in reducing overhead and complexity. This is shown, for example, in the fact that large commercial software applications are frequently released with hundreds of uncorrected defects.

Therefore, much I/O (e.g. GUI) development has migrated to new languages, and even scripting tools with limited scope (e.g. Macromedia Flash®). While these tools may eliminate the overhead of glue logic (code required to hold the other software components together), they are often slow and large, and prevent the program from calling subroutines outside the language. They also often require the end user to install a runtime environment (i.e. a virtual machine state such as JAVA® and .NET® that provides software services for processes or programs while a computer is running—the runtime environment may pertain to the operating system itself or the software that runs beneath it).

The Shell Framework 100

Figure 4:
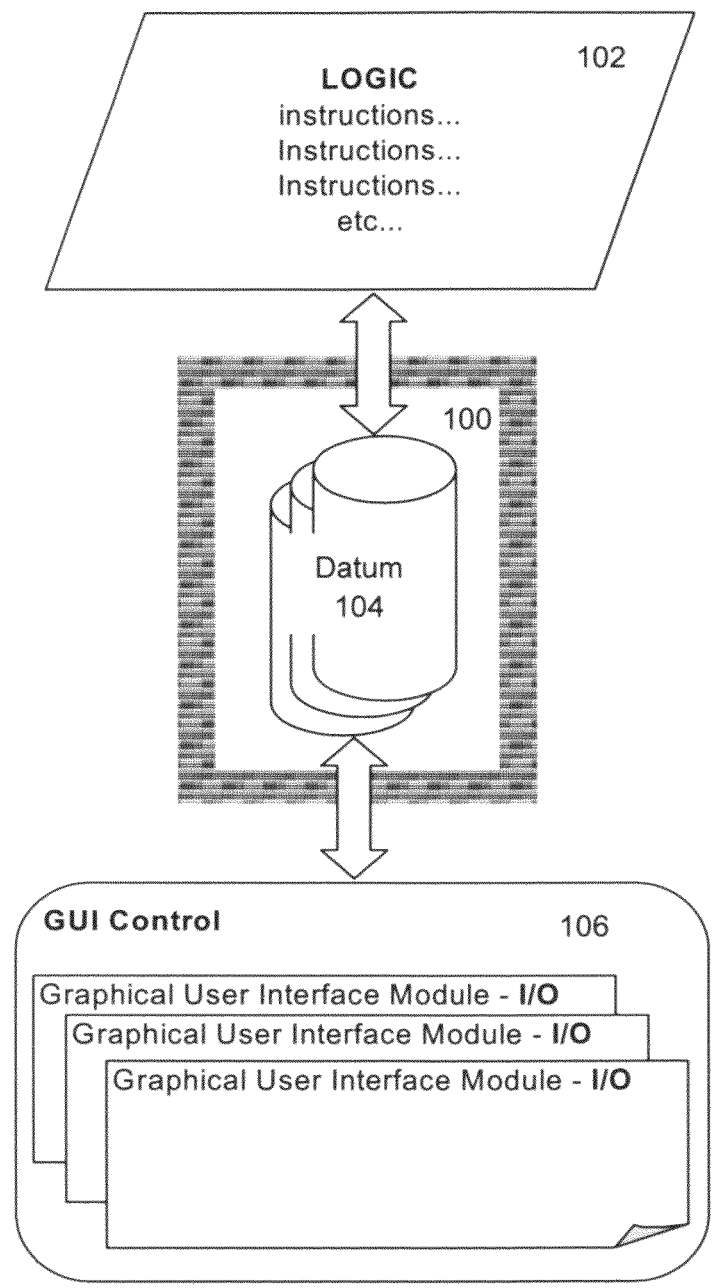
FIG. 4 is a block schematic arrangement for a simplified preferred exemplary embodiment of the Shell framework of the present invention.

The present invention offers an entirely different approach, discussed herein as the Shell framework, the Shell programming interface and infrastructure, the Shell construct, the Shell architecture, and/or Shell 100. Crucial to the Shell framework is that the Logic 102 is concerned only with the semantics of changes to the Data 104; Logic 102 is entirely separated from GUI 106. Using the Shell framework, a developer/programmer writing Logic 102 does not have to be concerned with GUI 106. Similarly, using the Shell framework, a developer/programmer writing GUI 106 does not have to be concerned with Logic 102. This allows for multiple developers/programmers or teams of developers/programmers to work on a particular project more efficiently and more accurately. Developers/programmers who work with Logic 102 do not have to be familiar with I/O 106 and, similarly, developers/programmers who work with I/O 106 do not have to be familiar with Logic 102. A simplified version of the Shell framework 100 is shown in FIG. 4 and, in more detail, in FIG. 5. The Shell 100 provides the programming interface and infrastructure that manages, and communicates bi-directionally with, Logic 102, GUI 106, and External (Ext) 108 or Simulated Sources. The Shell 100 is able to look at the Data Descriptor 110 to assist in the management (e.g. signal flow and notification paths) of notification messages pertaining to the Data 104.

Figure 1:
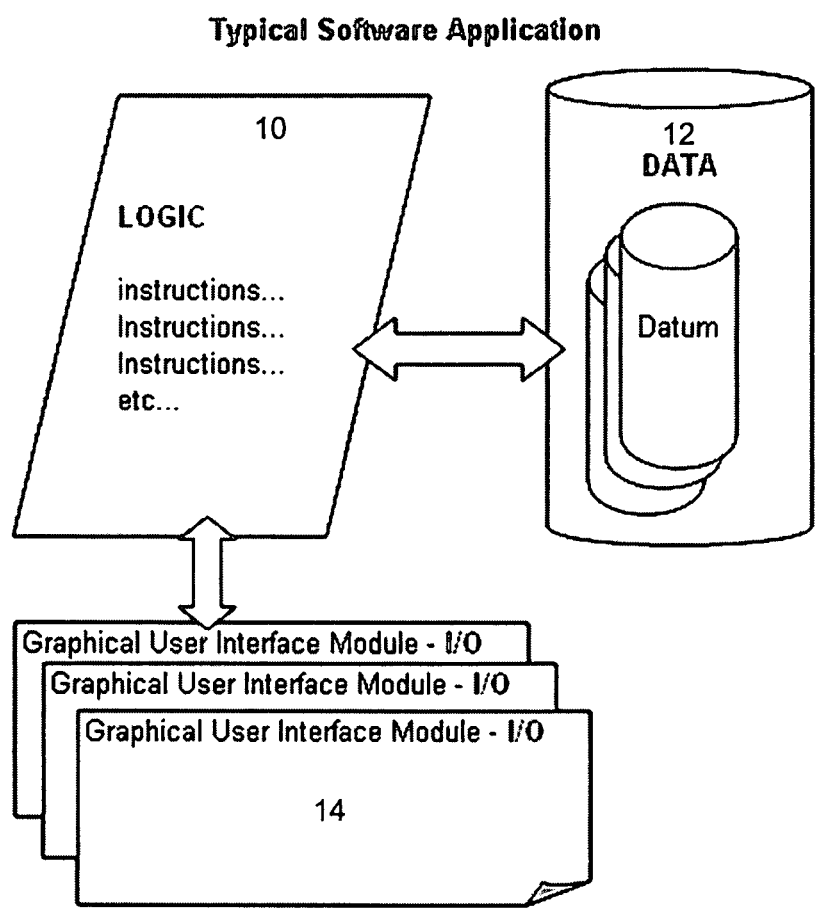
FIG. 1 is a block schematic arrangement for a prior art paradigm in which Logic is a functional intermediary between Data and I/O.
Figure 5:
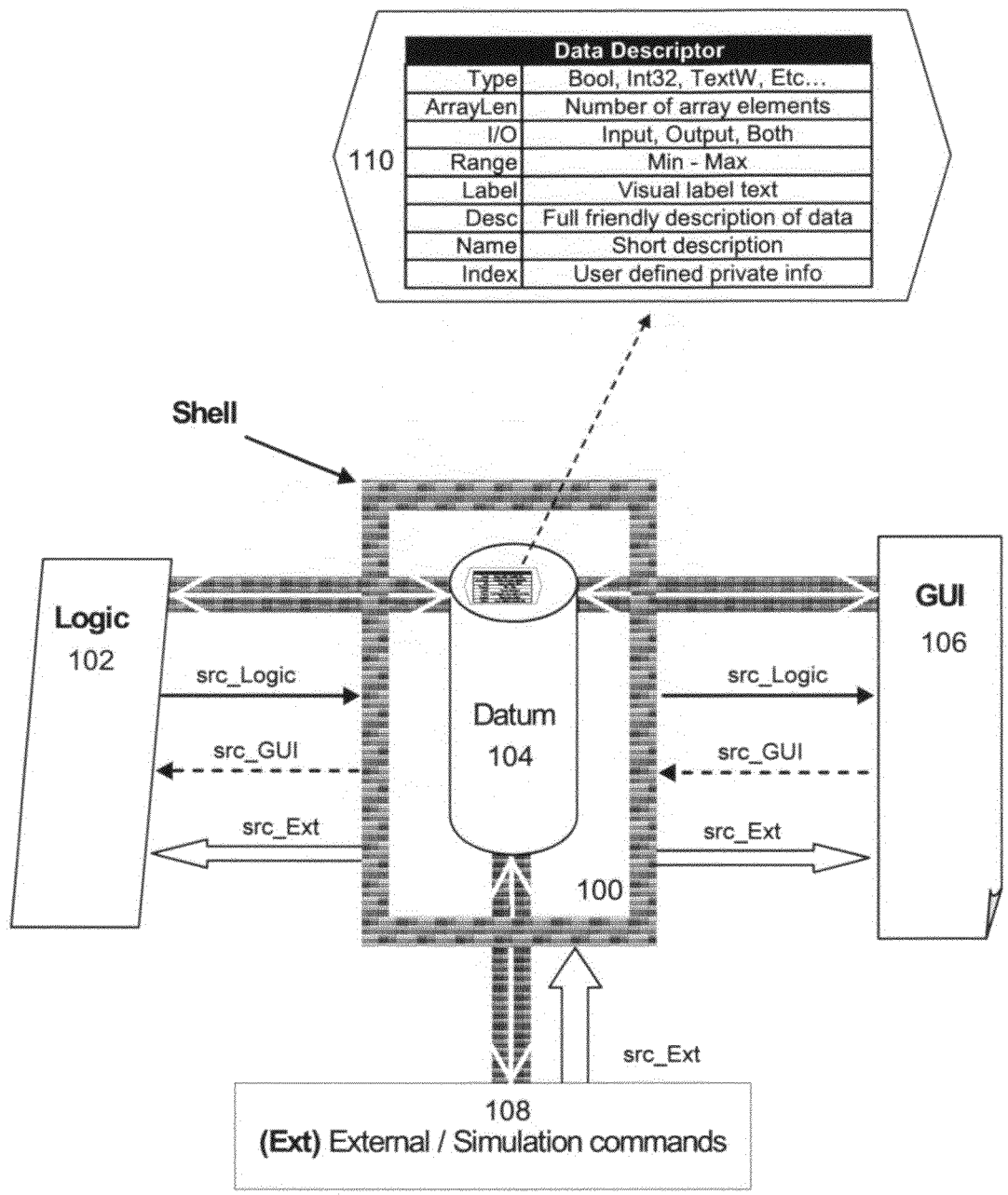
FIG. 5 is a block schematic arrangement for a more detailed preferred exemplary embodiment of the Shell framework of the present invention.

The Shell framework paradigm of FIGS. 4 and 5 is significantly different than the paradigm in which Logic 10 is a functional intermediary between Data 12 and I/O 14 as shown in FIG. 1. For example, the embodiment of FIG. 1 uses Logic 10 between Data 12 and the GUI 14. Logic 10 and GUI 14, therefore, are necessarily connected. On the other hand, the Shell framework embodiment shown in FIGS. 4 and 5 specifically separates Logic 102 from GUI 106, communications therebetween flowing through the Shell 100.

Figure 2:
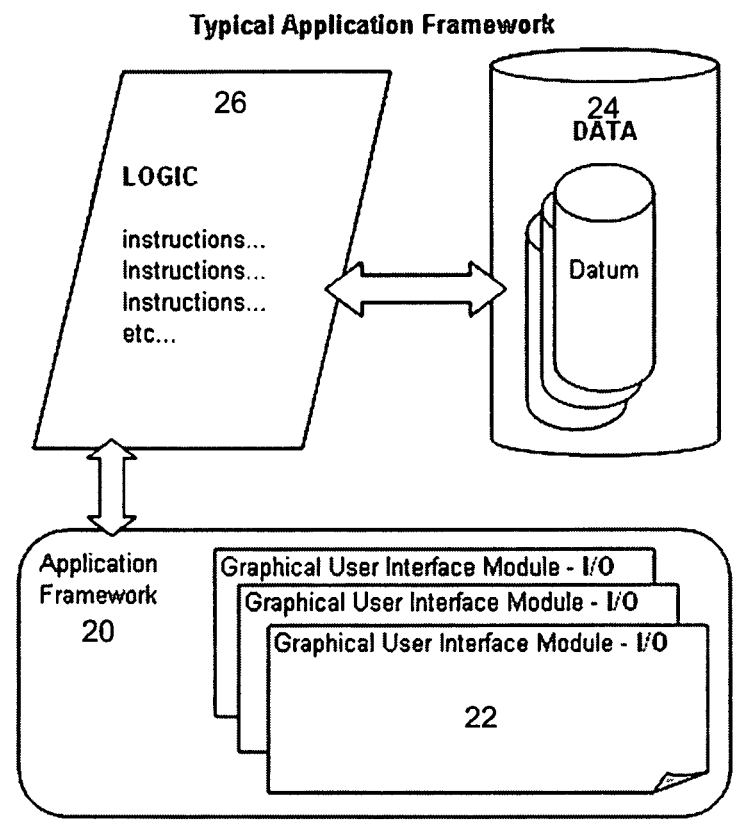
FIG. 2 is a block schematic arrangement for a prior art paradigm, similar to the paradigm shown in FIG. 1, except that an Application Framework is used as a wrapper for the GUI underneath.

The Shell framework paradigm of FIGS. 4 and 5 is significantly different than the paradigm in which an Application Framework 20 is used as a wrapper for the GUI 22 underneath as shown in FIG. 2. For example, as with the embodiment shown in FIG. 1, Logic 26 is still acting as a functional intermediary between Data 24 and the GUI 22, although the Application Framework 20 adds a buffer around the GUI 22. On the other hand, the Shell framework embodiment shown in FIGS. 4 and 5 specifically separates Logic 102 from GUI 106, communications therebetween flowing through the Shell 100.

Figure 3:
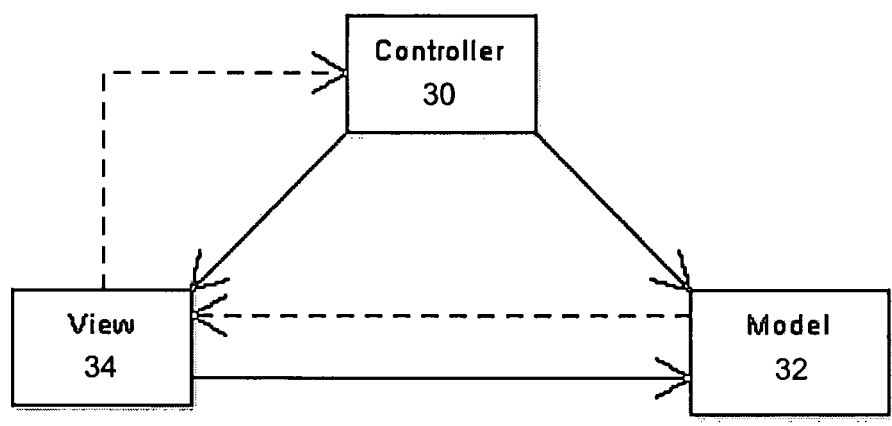
FIG. 3 is a block schematic arrangement of a prior art model view controller paradigm in which Data and that part of the Logic that gives the Data domain-specific meaning are merged into a Model object.

The Shell framework paradigm of FIGS. 4 and 5 is significantly different than the model view controller paradigm in which Data and that part of the Logic that gives the Data domain-specific meaning are merged into a Model object 32 as shown in FIG. 3. As shown in FIG. 3, the model view controller paradigm uses three objects (Controller 30, Model 32, and View 34), each of which is in direct communication (at least one way) with the others. The Shell framework embodiment shown in FIGS. 4 and 5 specifically separates Logic 102 from GUI 106, communications therebetween flowing through the Shell 100.

The Logic 102

The developer/programmer responsible for the Logic 102 writes code that manages Data 104. This is an efficient mode of development. Detailed knowledge of GUI 106 is no longer required. In other words, the Logic developer/programmer can work independently of (and even in parallel with) the GUI developer/programmer.

The Logic 102 is concerned only with the semantics of changes to the Data 104; Logic 102 is entirely separated from GUI 106. Using the Shell 100 as the intermediary, the Logic 102 is notified when Data 104 is changed by the GUI 106 using src_GUI (FIG. 5) (also see "Notify Logic Procedure" in FIG. 8). This gives Logic 102 a chance to correct a mistake or to recalculate whatever may depend on the value of the Data 104.

The GUI 106

GUI 106 often requires a creative visual design. Using the Shell architecture 100 of the present invention, there is no burden on the developer/programmer to know and understand the details of how the Logic 102 works. The developer/programmer is only concerned with display representation (e.g. GUI 106). In other words, the GUI developer/programmer can work independently of (and even in parallel with) the Logic developer/programmer.

Figure 8:
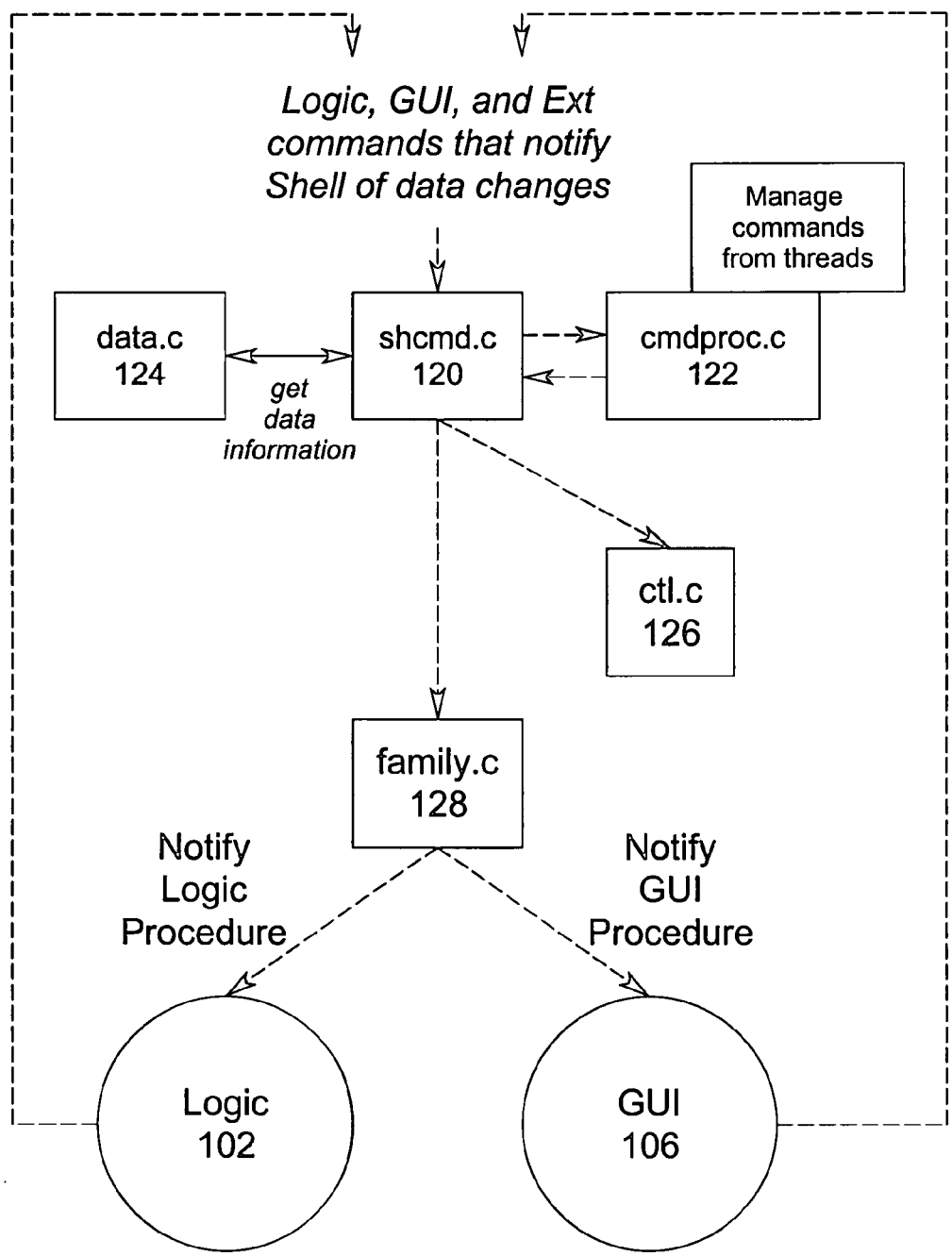
FIG. 8 is a block schematic arrangement for an exemplary embodiment of dataflow between the exemplary preferred modules of the present invention.

Using the Shell 100 as the intermediary, the GUI 106 is notified when Data 104 is changed by the Logic 102 using src_Logic (FIG. 5) (also see "Notify GUI Procedure" in FIG. 8). GUI 106 responds to Data 104 change messages by updating the interface device (e.g. a screen). GUI 106 also responds to user-initiated changes (e.g. mouse clicks) by changing the value of the Data 104.

The GUI 106 has no knowledge of what the various Data 104 values may mean, or what actions occur as a consequence. The I/O's only hint of what is possible for a specific Data 104 is its Data Descriptor 110 (described herein) allowing for fundamental type, bounds, and error checking.

The Data 104

The central component of the Shell architecture 100 of the present invention is Data 104. The Data 104 is abstracted by a "Data Descriptor 110" that provides information to the Shell 100 about the Data 104. For example, the "Data Descriptor 110" might provide information including, but not limited to the following: the "owner" of the Data (e.g. family.c); the type of Data; the range of Data; whether the Data is input, output, or both; user-friendly strings; labels; and application-defined private information.

When Data 104 is changed, the Logic 102 and/or GUI 106 must be notified. Therefore, the Data 104 also stores the address of a subroutine for the Logic 102 and for the GUI 106. When a change occurs in the Data 104, the Logic 102, the GUI 106, or both the Logic 102 and the GUI 106 are notified using their function pointers. In the following sections of this specification, "source" refers to the component that changed the value of the Data 104 (either Logic 102 or GUI 106). If Logic 102 is the source, then the GUI 106 is notified. If GUI 106 is the source, then the Logic 102 is notified.

The change to the Data 104 could be performed in one of two ways: (1) the source changes the Data 104 and sends a message notifying the Shell 100 that the information in the Data 104 has been changed, or (2) the source sends a message to the Shell 100 requesting that the Data 104 make the change.

External (Ext) or Simulated Sources 108

In order to support record and playback of internal communication through Data 104, there is an additional component that can be the source of changes to Data 104. This optional component is called Ext (i.e. External) 108 (see FIG. 5). When Ext 108 is the source of change to Data 104, then both Logic 102 and GUI 106 are notified. Specifically, using the Shell 100 as the intermediary, both Logic 102 and GUI 106 are notified when Data 104 is changed by the Ext 108 using src_Ext (FIG. 5).

The Shell 100

As set forth above, the Shell 100 provides the programming interface and infrastructure that manages, and communicates bi-directionally with, Logic 102, GUI 106, and Ext 108. The Shell 100 is able to look at the Data Descriptor 110 to assist in the management (e.g. signal flow and notification paths) of notification messages pertaining to the Data 104.

Figure 6:
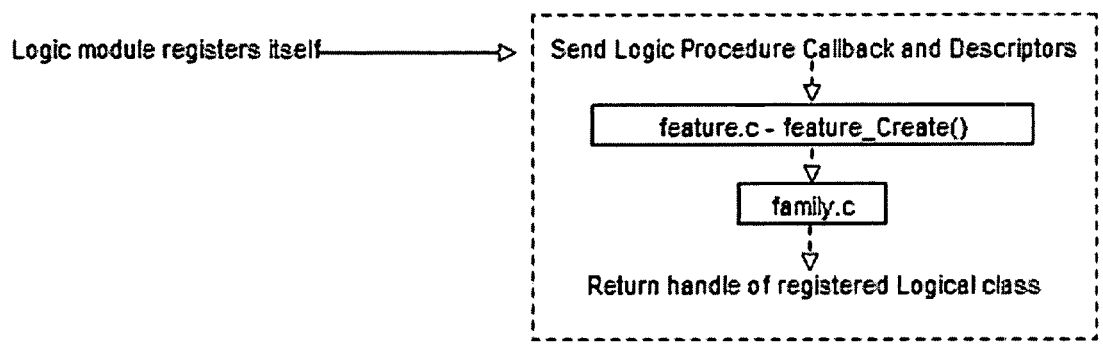
FIG. 6 is a flow chart of a preferred exemplary embodiment of a method in which the Logic component registers itself with the Shell architecture.
Figure 7:
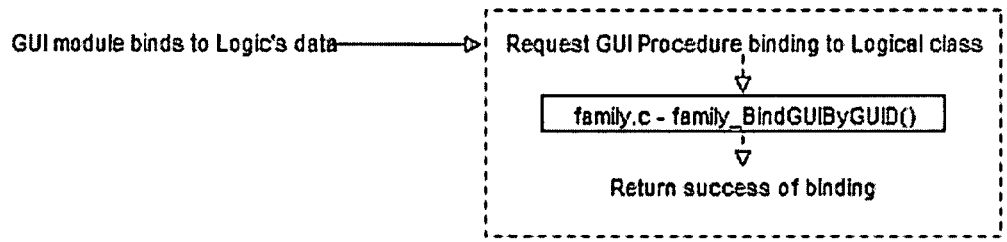
FIG. 7 is a flow chart of a preferred exemplary embodiment of a method in which the GUI module 106 binds itself to the Logic class.

How To Create a Logic/GUI Family (Logical Class) FIGS. 6 and 7 show one exemplary preferred method of how to create a Logic/GUI family (logical class). A family is made up of a Logic 102 component, Data component(s) 104, and an optional GUI component(s) 106. The method includes three steps: (1) a Logic component 102 registers itself with the Shell 100 to define a family and give it a name; (2) a GUI module 106 optionally binds itself to the family; and (3) a family is instantiated.

A family is a feature registered with the Shell 100 that can be instantiated and called from anywhere. Once a family feature is registered any number of instances of the family feature can be created through family_Call( ). The family's Logic 102 provides a desired service, and defines an array of #data_DESC (Data Descriptor 110) to communicate with its optional GUI component 106. With each instantiation of a family a #data_HANDLE array is created from the #data_DESC along with a separate instance of the family's private data. The Data 104 and memory for the family's private data comprises the family instance.

Step 1—A Logic component 102 registers itself with the Shell 100 to define a family and give it a name. An example of the registering step can be seen in FIG. 6 as follows: Logic 102 send its Logic Procedure Callback (the "address" where notifications for Logic 102 are to be sent) and Descriptors (array of data_DESC elements (Data Descriptor 110)) to the Shell 100; using feature.c (see Appendix A) and feature_Create( ), Shell 100 creates the registration of Logic 102; feature_Create( ) calls family.c (see Appendix A) to add a new family to a registration list maintained in Shell 100; and Shell 100 returns the handle of the registered family to the user (the caller of feature_Create( ). It should be noted that there may be multiple Shells 100 and each shell may have multiple features. It should be noted that a family is one type of feature.

Step 2—Optionally, a GUI module 106 then binds itself (registers its GUI Procedure Callback) to the family. This can be seen in FIG. 7 as follows: requesting a GUI procedure binding the GUI 106 to the family; using family.c (see Appendix A) and family_BindGUIByGUID( ), the handle of the family is internally retrieved and used to register the GUI 106 with the desired family; and returning notification of the success of the binding.

Step 3—To instantiate the family call family CallByGUID( ), a programmer can call the family by using the name or the handle. This creates a unique instance of the family.

How To Update Data 104

As seen in FIG. 8, any time a Data object 104 is updated, the shcmd (shell command) module 120 is called to notify the proper component(s) that the Data object 104 has been updated. As shown in FIG. 8, the Data object 104 may be updated by Logic 102, GUI 106, or Ext 108 (shown in FIG. 5). The shcmd is called whenever any family (or component thereof) or module is updated, added, accessed, or otherwise acted upon. Notification can be sent to any appropriate destination(s) (e.g. a data owner, a family (or component thereof), or a construct (e.g. Logic 102 or GUI 102).

The shcmd (shell commands) module 120 contains functions for basic intra-shell family communication and opcodes used in Shell 100 communication. The originator or source (Logic 102, GUI 106, or Ext 108) sends calls to shcmd_Send and shcmd_Post. The originator or source of the call determines the destination of the notification (letting at least one other component know that the Data 104 has been modified). When the source is GUI 106, the notification will go to Logic 102. When the source is Logic 102, the message goes to GUI 106. If the source is external (Ext) or unknown, the message will go to both Logic 102 and GUI 106.

Command objects are the first parameter in #shcmd_Post and #shcmd_Send. The cmdproc module 122 (or command processor buffer helper function) is for Shell 100 internal use only. The functions performed by the cmdproc module 122 are used for asynchronous shell commands for use on the different threads handled by the Shell 100. The functions performed by the cmdproc module 122 are used internally by the Shell 100 and should not be called directly.

Data module 124 (the Shell module that is used to interface Shell 100 with Data 104) provides Data 104 information such as variables and lists that are encapsulated in an object call (data_HANDLE) from the shcmd module 120. The segregation in the Shell 100 between Logic 102, GUI 106, and controls relies on the Data module 124. In the Shell architecture, the #data_DESC defines the interface to a Logic plug-in. From this data_DESC, the GUI plug-in family chooses a lay out of controls to manage the Logic's data. The shell commands sent between a family's Logic 102, GUI 106, and controls are most commonly updates to Data 104. When a data update command is received from the Shell 100, the modified data value can be retrieved and acted on accordingly.

The ctl (control) module 126 is used for base control functionality. Controls are the widgets chosen by the GUI plug-in designer to manage the Logic's Data 104 (data_HANDLE). They can be thought of as short cuts. Once a control is bound to a data_HANDLE, modifications are made to the data signal messages using the control 126 and Logic 102 directly. Much of the work of the GUI plug-in is handled by the controls 126 because no GUI code needs to be written to have the GUI 106 reflect what is in the Data 104. Each control knows how to display the Data 104 to which it is bound. Each control 126 is a feature and is created using feature_Create( ). The ctl module 126 manages all controls in the Shell 100.

In the context of FIG. 8, the family module 128 is used to determine the destination associated with the originator or source. A family is made up of a Logic 102 and optional GUI component 106. The family module 128 is provided with the originator or source (e.g. Logic 102) and returns the destination (e.g. the GUI 106) to be notified.

Descriptions of Select Modules cmdproc—Multi-processing threading buffer for shcmd ctl—Internal GUI control processor data—Data 104 object handler family—Logic/GUI class manager feature—Shell's core atomic component manager shcmd—Shell's command processor shell—Shell's core manager Descriptions of subroutines (functions) are detailed within the .h files (see Appendix A) for each module.

EXAMPLE

A Complete Plug-In

There are three projects involved in this complete plug-in: a Main project, a DLL project for the Logic module 102, and a DLL project for the GUI module 106. The main project is simply a mostly empty Shell 100 that loads the example Logic and GUI modules as plug-ins. These plug-ins create a dialog box and additionally create six (6) Shell features displayed in the Shell's main window as shown in FIG. 9.

Figure 9:
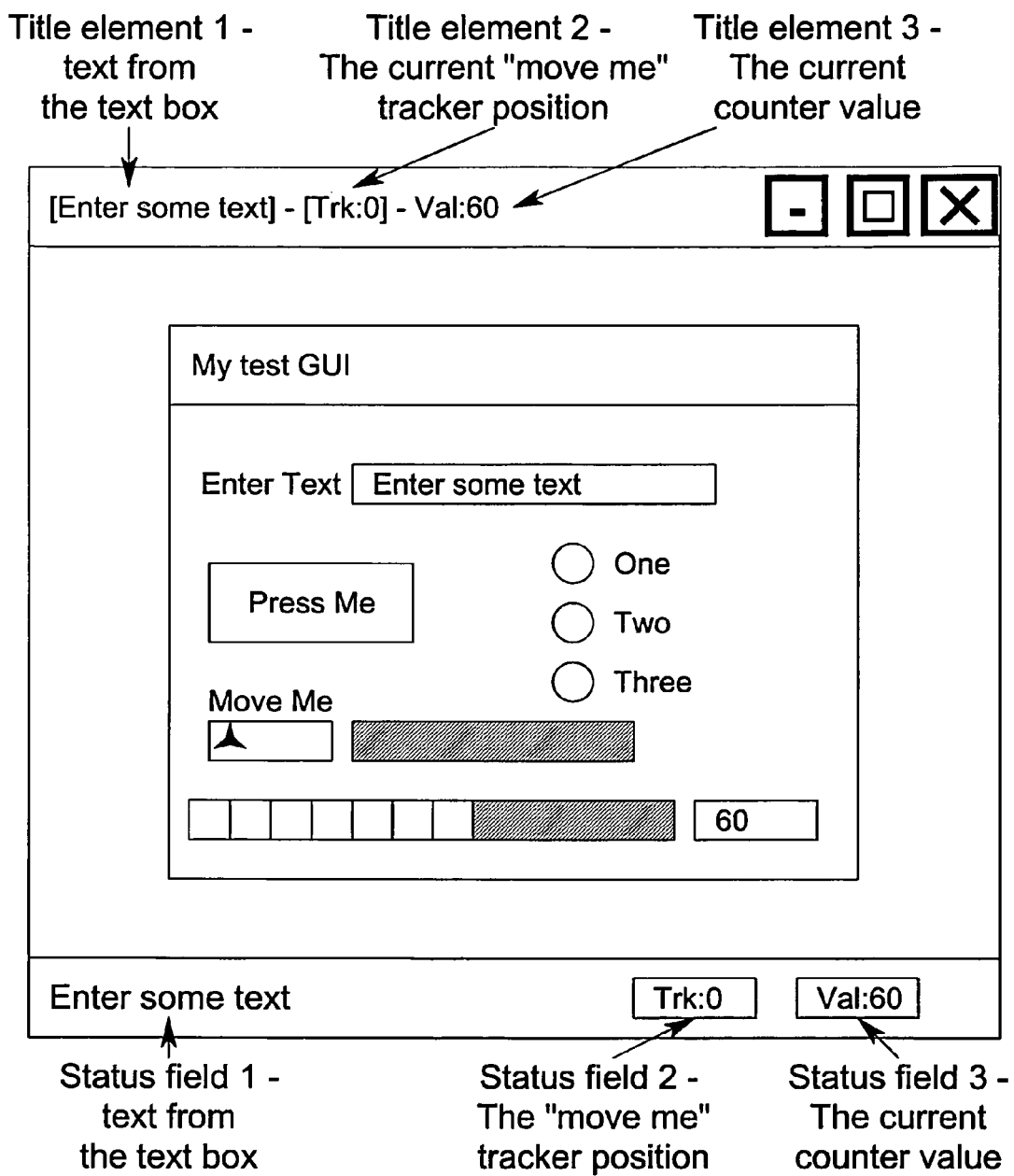
FIG. 9 illustrates an exemplary simplified dialog box showing Shell features displayed in the main Shell's window of the present invention.

As shown in FIG. 9, the user can change text in the "Enter Text" textbox, and the modified contents will be displayed in the Shell's title bar as well as in a status field. Clicking on the "Press Me" button causes a tri-state data element to cycle from one to three. The states are reflected in the radio buttons to the right of the "Press Me" button.

If the user drags the pointer in the "move me" mini-tracker, the position will reflected in the VU meter shown as a black bar to the right of the "move me" mini-tracker. Additionally, the numerical value may be reflected in both the title bar and a status field.

A numerical value, referred to as the counter, continuously cycles from 0 to 100 on a 50 millisecond timer. The counter value is reflected in the VU meter at the bottom of the plug-in dialog, and numerically displayed in three places: to the right of the VU meter, in the title bar, and in a status window.

It is not necessary for a plug-in to be a DLL but it is often the case, as plug-ins can be added to an application after the application has been released.

The Main Module

The main module creates a Shell 100 and loads the plug-in. This exemplary embodiment of the main module consists of one file: main.c, an exemplary embodiment of which is as follows:

```
00001   /*******************************************************************
00002   File:       main.c
00003   Version:    1.0
00004   Copyright:  2004 DiamondWare, Ltd.
00005   Written:    by R. Mathieu
00006   Project:
00007   Purpose:
00008   History:
00009   *******************************************************************/
00010
00011   #define INITGUID
00012
00013
/*=================================================================
00014                       INCLUDES
00015
=================================================================*/
00016   #define WIN32_LEAN_AND_MEAN
00017   #include <windows.h>
00018   #include <stdio.h>
00019
00020   #include "shell\shell.h"
00021
00022   #include "mylogic\public.h"
00023
00024   #include "resource.h"
00025
00026
/*=================================================================
00027                       PRAGMAS
00028
=================================================================*/
00029   #pragma comment( lib, "Iphlpapi")     // IP Helper API
00030
00031
/*=================================================================
00032                       DEFINES
00033
=================================================================*/
00034
00035
00036
/*=================================================================
00037                       DATA
00038
=================================================================*/
00039
00040   static shell_HANDLE   shellhan;
00041
00042
00043
/*=================================================================
00044                       CODE
00045
=================================================================*/
00046
00047   /*-----------------------------------------------------------------
00048       Load plugin
00049   -----------------------------------------------------------------*/
00050   static BOOL LoadPlugin(WCHAR *filename, WCHAR *myname)
00051   {
00052     library_CREATE   c;
00053     feature_HANDLE   featurehan;
00054     BOOL             rv;
00055
00056     c.file  = filename;
00057
00058     featurehan = feature_Create( shellhan,
00059                        feature_TYP_LIBRARY,
00060                        &c,          // Library creation parameters
00061                        myname,      // Optional name of plug-in
00062                        NULL,        // Assign no GUID for this external library
00063                        NULL,
00064                        NULL);
00065
00066     rv = (featurehan != feature_HANDLE_INVALID) ? TRUE : FALSE;
00067     return rv;
00068   }
00069
```

```
00070    /*------------------------------------------------------------------------
00071       Run application
00072    ------------------------------------------------------------------------*/
00073    static void RunApp(void)
00074    {
00075       BOOL      alive = TRUE;
00076       MSG       msg;
00077
00078       while (GetMessage(&msg, NULL, 0, 0))
00079       {
00080          UINT32 found = 0;
00081
00082          found |= shell_IsMessage(shellhan, &msg, &alive, 0);
00083
00084          if (!alive)
00085          {
00086             break;
00087          }
00088
00089          if (!found)
00090          {
00091             // No... then handle the window messages this way
00092                     TranslateMessage( &msg );
00093                     DispatchMessage( &msg );
00094          }
00095       }
00096    }
00097
00098    static BOOL IdleFn(feature_REASON reason, feature_INFO *pfeatureinfo, shell_PARAM userparam)
00099    {
00100       /* Heartbeat */
00101
00102       return TRUE;
00103    }
00104
00105    /*------------------------------------------------------------------------
00106       Windows Entry Point
00107    ------------------------------------------------------------------------*/
00108    int APIENTRY WinMain( HINSTANCE hInstance,
00109                          HINSTANCE hPrevInstance,
00110                          LPSTR     lpCmdLine,
00111                          int       nCmdShow)
00112    {
00113       shell_CREATE    create;
00114
00115       shell_Init( );             // Initialize Shell services
00116
00117
00118       ZeroMemory(&create, sizeof(create));
00119
00120       create.guiEnabled   = TRUE;
00121
00122       create.cmdidbase    = 0xf000;
00123       create.cmdidaccels  = 256;
00124       create.cmdidmenus   = 256;
00125
00126       create.regfile      = NULL;
00127       create.regtyp       = shellreg_STORE_NONE;
00128
00129       create.hInstance    = hInstance;                        // Application Instance
00130       create.dlgrc        = MAKEINTRESOURCE(IDD_MAIN),    // Dialog resource ID
00131
00132       // Create a single object object
00133       shellhan = shell_Create(&create);
00134
00135       if (shellhan == NULL)
00136       {
00137          // Error creating Shell
00138       }
00139       else if ( LoadPlugin(L"ctls.dll", L"mycontrols") == FALSE )
00140       {
00141          // Error loading DLL plug-in
00142       }
00143       else if ( LoadPlugin(L"mylogic.dll", L"mylogic") == FALSE )
00144       {
00145          // Error loading DLL plug-in
00146       }
00147       else if ( LoadPlugin(L"mygui.dll", L"mygui") == FALSE )
```

-continued

```
00148      {
00149          // Error loading DLL plug-in
00150      }
00151      else
00152      {
00153         family_CALL   call;
00154
00155         ZeroMemory(&call, sizeof(call));
00156         family_CallByGUID(shellhan, &public_GUID_MYFAMILY, &call);
00157
00158         RunApp( );
00159      }
00160
00161      shell_Kill( );
00162
00163      return 0;
00164    }
00165
```

This exemplary embodiment of main.c is essentially a minimalist Windows application. WinMain creates a Shell 100, loads the Logic 102 and GUI 106 plug-ins, instantiates a family, and enters a message loop.

Loading Plug-Ins

The demonstration main application (main.c) provides a function for loading plug-ins:

```
staticBOOL LoadPlugin(WCHAR *filename, WCHAR *myname)
{
  library_CREATE    c;
  feature_HANDLE    featurehan;
  BOOL              rv;
  c.file  = filename;
  featurehan = feature_Create( shellhan,
             feature_TYP_LIBRARY,
             &c,          // Library creation parameters
             myname,      // Optional name of plug-in
             NULL,        // Assign no GUID for this external library
             NULL,
             NULL);
  rv = (featurehan != feature_HANDLE_INVALID) ? TRUE : FALSE;
  return rv;
}
```

Plug-ins are loaded via a call to feature_Create, specifying feature_TYP_LIBRARY for the feature_TYP parameter and by initializing a library_CREATE structure.

WinMain actually loads three plug-ins: an example Logic module 102, an example GUI module 106, and a plug-in that implements controls that can bind directly to the Logic module 102:

```
    else  if  (LoadPlugin(L"ctls.dll",  L"mycontrols")== FALSE)
    {
    // Error loading DLL plug-in
    }
    else if (LoadPlugin(L"mylogic.dll", L"mylogic")== FALSE)
    {
    // Error loading DLL plugin
    else if (LoadPlugin(L"mygui.dll", L"mygui")==FALSE)
    {
    // Error loading DLL plugin
    }
    else
    {
    family_CALL call;
    ZeroMemory(&call, sizeof(call));
    family_CaIIByGUID(shellhan, &public_GUID_MYFAMILY, &call);
    RunApp( );
    }
```

Plug-In Logic 102

The job of the Logic 102 plug-in is to define an interface for the plug-in family, and implement the actions taken on the family's interface. The interface is defined in terms of an array of data_DESC elements (Data Descriptor 110). Once the data_HANDLE (Data 104) elements are instantiated (e.g. the Logic or GUI construct has received its DATA_INIT notification), the Logic or GUI construct can read the datum in Data 104, modify the datum in Data 104, and/or send notifications to the Shell 100 about the datum in Data 104.

The common schema for doing this is to define a public.h file that contains an enumeration of the Datum 104 elements. The public.h file also defines the family name and GUID (Globally Unique Identifier). This allows the family to be found (family_FindByName( ) family_FindByGUID( )), and subsequently called/instantiated (family_Call( ) family_CallByGUID( )).

Put in terms of an object oriented paradigm, the creation of a family is defining a class inside of the Shell 100. Calling a family is equivalent to instantiating an object of this class.

Public

The following in an exemplary code for implementing Public:

```
00001    /****************************************************************
00002    File:       public.h
00003    Version:    1.0
00004    Copyright:  2004 DiamondWare, Ltd.
00005    Written:    by R. Mathieu
00006    Project:
00007    Purpose: Logic's PUBLIC header used #included by GUI plug-in
00008    History:
00009    ****************************************************************/
```

-continued

```
00010
00011    #ifndef public_HEADER
00012      #define public_HEADER
00013
00014      #ifdef __cplusplus
00015        extern "C" {
00016      #endif
00017
00018
00019      static WCHAR public_MyModuleName[ ] = L"MyFirstFamily";
00020
00021      DEFINE_GUID(public_GUID_MYFAMILY, 0x11E03272, 0x2BC1,
0x4A0C, 0x8B, 0x19, 0x21, 0x01, 0xFF, 0x68, 0x70, 0x20 );
00022
00023
00024      enum
00025      {
00026        public_FIRST,
00027
00028        public_MYTEXT          = public_FIRST, //{  data_TYP_TEXTW,
32, data_IO_BOTH, },
00029        public_TESTBTN,                //{  data_TYP_BOOL,   1,
data_IO_INPUT },
00030        public_ONETWOTHREE,            //{  data_TYP_UINT32,  1,
data_IO_BOTH },
00031
00032        public_MINITRK,                //{  data_TYP_UINT32,  1,
data_IO_BOTH, 0, 100 },
00033        public_METER,                  //{  data_TYP_UINT32,  1,
data_IO_BOTH, 0, 100 },
00034
00035        public_COUNTER,                //{  data_TYP_UINT32,  1,
data_IO_BOTH, 0, 100 },
00036        public_COUNTER2,               //{  data_TYP_UINT32,  1,
data_IO_BOTH, 0, 100 },
00037
00038        public_NUMOBJECTS,
00039        public_LAST = public_NUMOBJECTS − 1
00040      };
00041
00042
00043      #ifdef __cplusplus
00044        }
00045      #endif
00046
00047    #endif
00048
```

Walk Through static WCHAR public_MyModuleName[ ]=L"MyFirstFamily";

DEFINE_GUID(public_GUID_MYFAMILY, 0x11E03272, 0x2BC1, 0x4A0C, 0x8B, 0x19, 0x21, 0x01, 0xFF, 0x68, 0x70, 0x20);

The string and GUID identifiers allow the family, once loaded into the Shell 100, to be found by others. The family can be found by the string with family_FindByName( ) or GUID with family_FindByGUID( ).

```
enum
{
  public_FIRST,
  public_MYTEXT    = public_FIRST, //{ data_TYP_TEXTW, 32,
data_IO_BOTH, },
  public_TESTBTN,            //{ data_TYP_BOOL, 1,
data_IO_INPUT },
  public_ONETWOTHREE,        //{ data_TYP_UINT32, 1,
data_IO_BOTH },
  public_MINITRK,            //{ data_TYP_UINT32, 1,
data_IO_BOTH, 0, 100 },
  public_METER,              //{ data_TYP_UINT32, 1,
data_IO_BOTH, 0, 100 },
  public_COUNTER,            //{ data_TYP_UINT32, 1,
data_IO_BOTH, 0, 100 },
  public_COUNTER2,           //{ data_TYP_UINT32, 1,
data_IO_BOTH, 0, 100 },
  public_NUMOBJECTS,
  public_LAST = public_NUMOBJECTS − 1
};
```

The above enumeration names each index of the array of Data 104 items within the family. This enumeration can be accessed by, for example, Logic 102 and GUI 106.

Logic 102

The following in an exemplary code for implementing Logic 102:

```
00001   /***********************************************************
00002   File:     lgc.c
```

-continued

```
00003    Version:    1.0
00004    Copyright:  2004 DiamondWare, Ltd.
00005    Written:    by R. Mathieu
00006    Project:
00007    Purpose:
00008    History:
00009    ****************************************************************/
00010
00011    #define INITGUID
00012    #define INSIDE_DLL
00013
00014
/*===========================================================
00015                    INCLUDES
00016
===========================================================*/
00017    #define WIN32_LEAN_AND_MEAN
00018    #include <windows.h>
00019
00020    #include "shell\shell.h"
00021
00022    #include "public.h"
00023
00024
/*===========================================================
00025                    PRAGMAS
00026
===========================================================*/
00027
00028    #pragma comment(linker, "/OPT:NOWIN98")   // Exclude Windows 98
00029
00030
/*===========================================================
00031                    DEFINES
00032
===========================================================*/
00033
00034    typedef struct
00035    {
00036       feature_HANDLE    tmr_feat;
00037
00038    } MYOBJ;
00039
00040
/*===========================================================
00041                    DATA
00042
===========================================================*/
00043
00044    static data_DESC   objectlist[ ] =
00045    {
00046       { data_TYP_TEXTW, 32, data_IO_BOTH, },        // MYTEXT
00047       { data_TYP_BOOL, 1, data_IO_INPUT },          // TESTBTN
00048       { data_TYP_UINT32, 1, data_IO_BOTH, },        // ONETWOTHREE
00049
00050       { data_TYP_UINT32, 1, data_IO_BOTH, 0, 100 }, // MINITRK
00051       { data_TYP_UINT32, 1, data_IO_BOTH, 0, 100 }, // METER1
00052
00053       { data_TYP_UINT32, 1, data_IO_BOTH, 0, 100 }, // COUNTER
00054       { data_TYP_UINT32, 1, data_IO_BOTH, 0, 100 }, // COUNTER2
00055    };
00056
00057
00058
/*===========================================================
00059                    CODE
00060
===========================================================*/
00061
00062
00063    /*----------------------------------------------------------------------
00064    ----------------------------------------------------------------------*/
00065    static BOOL TimerCallbackFn(feature_REASON reason, feature_INFO *pfeatureinfo, family_HANDLE familyhan)
00066    {
00067       if (reason == feature_REASON_ACTION)
00068       {
00069          family_INFO    familyinfo;
00070
00071          if (family_GetInfo(familyhan, &familyinfo))
```

```
00072        {
00073           UINT32 val;
00074
00075           // Get value from this family member's Data
00076           val = data_GetVal32(familyinfo.datahan[public_COUNTER], 0, NULL);
00077           // Change the value of Data (increment by 1)
00078           val = (val + 1) % 100;
00079
00080           // Set value for counter and counter2
00081           data_SetVal(familyinfo.datahan[public_COUNTER], val);
00082           data_SetVal(familyinfo.datahan[public_COUNTER2], val);
00083
00084           // Notify Shell of change
00085           shcmd_Post(familyinfo.datahan[public_COUNTER],
shcmd_SRC_LOGIC, shcmd_DATA_UPDATE, NULL, NULL);
00086           shcmd_Post(familyinfo.datahan[public_COUNTER2],
shcmd_SRC_LOGIC, shcmd_DATA_UPDATE, NULL, NULL);
00087        }
00088     }
00089
00090     return TRUE;
00091  }
00092
00093  /*------------------------------------------------------------------------
00094  ------------------------------------------------------------------------*/
00095  static void DestroyMyObj(MYOBJ *p)
00096  {
00097     feature_Destroy(p->tmr_feat);
00098  }
00099
00100  /*------------------------------------------------------------------------
00101     Handle action event for this item
00102  ------------------------------------------------------------------------*/
00103  static BOOL Action(family_INFO *pfamilyinfo, data_INFO *pdatainfo)
00104  {
00105     MYOBJ       *p = pfamilyinfo->plogic;
00106     data_HANDLE  datahan = pdatainfo ? pdatainfo->datahan : NULL;
00107
00108     if (data_Valid(datahan) && p)
00109     {
00110        UINT32 val;
00111
00112        switch(pdatainfo->id)
00113        {
00114        case public_TESTBTN:    // User clicked TEST BUTTON
00115
00116           // Get value from this family member's Data and change
00117           val = 1 + data_GetVal32(pfamilyinfo-
>datahan[public_ONETWOTHREE], 0, NULL);
00118
00119           if (val > 3)
00120           {
00121              val = 1;
00122           }
00123
00124           // Set new value for onetwothree
00125           data_SetVal(pfamilyinfo->datahan[public_ONETWOTHREE], val);
00126
00127           // Notify Shell
00128           shcmd_Post(pfamilyinfo->datahan[public_ONETWOTHREE],
shcmd_SRC_LOGIC, shcmd_DATA_UPDATE, NULL, NULL);
00129
00130           break;
00131        }
00132     }
00133
00134     return TRUE;
00135  }
00136
00137  /*------------------------------------------------------------------------
00138     Update data_HANDLE control
00139  ------------------------------------------------------------------------*/
00140  static BOOL DataUpdate(family_INFO *pfamilyinfo, data_INFO
*pdatainfo)
00141  {
00142     MYOBJ       *p = pfamilyinfo->plogic;
00143     data_HANDLE  datahan = pdatainfo ? pdatainfo->datahan : NULL;
00144
00145     if (data_Valid(datahan) && p)
00146     {
```

-continued

```
00147        UINT32 val;
00148
00149        switch(pdatainfo->id)
00150        {
00151        case public_MINITRK:
00152
00153            // Get value of Data value that changed
00154            val = data_GetVal32(datahan, 0, NULL);
00155
00156            // Set new value for meter
00157            data_SetVal(pfamilyinfo->datahan[public_METER], val);
00158
00159            // Notify Shell
00160            shcmd_Post(pfamilyinfo->datahan[public_METER],
shcmd_SRC_LOGIC, shcmd_DATA_UPDATE, NULL, NULL);
00161
00162            break;
00163        }
00164    }
00165
00166    return TRUE;
00167 }
00168
00169 /*------------------------------------------------------------------------
00170 ------------------------------------------------------------------------*/
00171 static BOOL CreateFamily( shell_INFO     *pshellinfo,     //
00172                           family_INFO    *pfamilyinfo,    //
00173                           family_CALL    *pcall,          //
00174                           MYOBJ          *p )             //
00175 {
00176    // Set value of mytext to some string
00177    data_SetPtr(pfamilyinfo->datahan[public_MYTEXT], TEXT("Enter some text"));
00178
00179    // Notify Shell
00180    shcmd_Post(pfamilyinfo->datahan[public_MYTEXT],
shcmd_SRC_LOGIC, shcmd_DATA_UPDATE, NULL, NULL);
00181
00182    {
00183       tmr_CREATE tc;
00184
00185       // Create timer feature every 50 milliseconds
00186       tc.millisecs = 50;
00187       p->tmr_feat = feature_Create( pshellinfo->shellhan,
00188                    feature_TYP_TMR,
00189                    &tc,
00190                    NULL,
00191                    NULL,
00192                    (feature_CALLBACK *)TimerCallbackFn,
00193                    pfamilyinfo->familyhan);
00194    }
00195
00196    return TRUE;
00197 }
00198
00199 /*------------------------------------------------------------------------
00200 ------------------------------------------------------------------------*/
00201 static BOOL FamilyProc( shell_INFO *pshellinfo,     //
00202                         family_INFO   *pfamilyinfo,  //
00203                         data_INFO     *pdatainfo,    //
00204                         shcmd_SRC     src,           //
00205                         shcmd_CMD     cmd,           //
00206                         shell_PARAM   param1,        //
00207                         shell_PARAM   param2 )       //
00208 {
00209    BOOL      rv = TRUE;
00210    MYOBJ     *p = pfamilyinfo->plogic;
00211    family_CALL   *pcall;
00212
00213    switch(cmd)
00214    {
00215    case shcmd_FAMILY_KILL:
00216       DestroyMyObj(p);
00217       break;
00218
00219    case shcmd_FAMILY_INIT:
00220       pcall = (family_CALL *)param1;
00221       CreateFamily(pshellinfo, pfamilyinfo, pcall, p);
00222       break;
00223
```

```
00224      case shcmd_FAMILY_NOTIFY:
00225          break;
00226
00227      case shcmd_DATA_UPDATE:
00228          DataUpdate(pfamilyinfo, pdatainfo);
00229          break;
00230
00231      case shcmd_DATA_ACTION:
00232          Action(pfamilyinfo, pdatainfo);
00233          break;
00234
00235      case shcmd_DATA_REFRESH:
00236          break;
00237      }
00238
00239      return rv;
00240  }
00241
00242  /*------------------------------------------------------------------------
00243  ------------------------------------------------------------------------*/
00244  void DWExit( dllfile_INFO *pdllinfo )
00245  {
00246  }
00247
00248  /*------------------------------------------------------------------------
00249  ------------------------------------------------------------------------*/
00250  UINT32 DWMain( dllfile_INFO *pdllinfo, shell_INFO *pshellinfo)
00251  {
00252      BOOL       rv = FALSE;
00253
00254      family_CREATE c;
00255      feature_HANDLE   featurehan;
00256
00257      ZeroMemory(&c, sizeof(c));
00258
00259      c.lgcproc      = FamilyProc;
00260      c.moduleowner  = pdllinfo->moduleowner;
00261      c.pdatadesc    = objectlist;
00262      c.count        = ARRAY_LEN(objectlist);
00263      c.sizeoflgc    = sizeof(MYOBJ);
00264
00265      featurehan = feature_Create( pshellinfo->shellhan,
00266                     feature_TYP_FAMILY,
00267                     &c,
00268                     public_MyModuleName,
00269                     &public_GUID_MYFAMILY,
00270                     NULL, NULL );
00271
00272      // Must include the symbol _dll_GetVersion of important module won't link
00273      return (featurehan != feature_HANDLE_INVALID) ? dll_GetVersion( ) : FALSE;
00274  }
00275
00276  /*------------------------------------------------------------------------
00277  ------------------------------------------------------------------------*/
00278  shcmd_SRC DWModuleType(const WCHAR **modulename)
00279  {
00280      *modulename = L"MyCustomModule-LOGIC";
00281      return shcmd_SRC_LOGIC;
00282  }
00283
```

Walk Through

```
typedef struct
{
```

```
    feature_HANDLE tmr_feat;
} MYOBJ;
```

This MYOBJ struct is defined to encapsulate the family instance private information. This family creates a timer feature.

```
static data_DESC objectlist[ ] =
{
    { data_TYP_TEXTW,  32,  data_IO_BOTH, },         // MYTEXT
    { data_TYP_BOOL,   1,   data_IO_INPUT },         // TESTBTN
    { data_TYP_UINT32, 1,   data_IO_BOTH, },         // ONETWOTHREE
    { data_TYP_UINT32, 1,   data_IO_BOTH, 0, 100 },  // MINITRK
```

| | | | |
|---|---|---|---|
| { data_TYP_UINT32, 1, | data_IO_BOTH, 0, 100 }, | // METER1 |
| { data_TYP_UINT32, 1, | data_IO_BOTH, 0, 100 }, | // COUNTER |
| { data_TYP_UINT32, 1, | data_IO_BOTH, 0, 100 }, | // COUNTER2 |
| }; | | |

The Data description array (Data Descriptor 110) defines the family's interface. The first three (3) fields of the data_DESC must be filled out. These are the data_DESC::typ, data_DESC::arraylen, and data_DESC::ioflags. Additionally, the Data description (Data Descriptor 110) can contain information as to what type of values can legally be assigned to the Data, such as minimum and maximum values, and types of strings (data.h).

Using the Data description (Data Descriptor 110) supplied by the Logic 102, the GUI 106 developer/programmer should be able to decide what type of widget to use to interact with the Data 104. In this demonstration, the types of widgets used for each of the elements of the Data 104 descriptions are added as comments. This is for demonstration purposes only, and it should be noted that the separation of Logic 102 and GUI 106 allow for any series of widgets to be used to interact with the Data 104. This widget choice is up to the GUI 106 developer/programmer.

static BOOL TimerCallbackFn(feature_REASON reason, feature_INFO *pfeatureinfo, family_HANDLE familyhan)
 {
 if (reason==feature_REASON_ACTION)

Every time a callback is received from the timer feature, the values of the counters are updated.

family_INFO familyinfo;
 if (family_GetInfo(familyhan, &familyinfo))
 {

First, the family information is requested from its instance. The family information returned includes the family_HANDLE::datahan. This is the Data 104 that was created from the Data description. The creation of Data 104 from the Data description is discussed later in this demonstration (Shell Command Processor).

UINT32 val;
 // Get value from this family member's Data
 val=data_GetVal32(familyinfo.datahan[public_COUNTER], 0, NULL);
 // Change it
 val=(val+1)% 100;

The value of the counter is then obtained by calling the data_GetVal32( ) function. Calling this function (data_GetVal32( )) is equivalent to calling data_Get( ) and dereferencing the returned pointer to a UINT32. The copy of the family's Data 104 is then modified.

data_SetVal(familyinfo.datahan[public_COUNTER], val);
 data_SetVal(familyinfo.datahan[public_COUNTER2], val);

Since a copy of the Data 104 is modified, the data_SetVal( )function is used to copy the Data 104 back into the family.

shcmd_Post(familyinfo.datahan[public_COUNTER], shcmd_SRC_LOGIC, shcmd_DATA_UPDATE, NULL, NULL);
 shcmd_Post(familyinfo.datahan[public_COUNTER2], shcmd_SRC_LOGIC, shcmd_DATA_UPDATE, NULL, NULL);
 }
 }
 return TRUE;
 }

The Shell 100 is now told that the Data 104 has been modified, so the Shell 100 can, in turn, notify the GUI 106 of the changes. There are two ways to signal an update on the Data 104, shcmd_Send( ) and shcmd_Post( ). These two functions are synchronous and asynchronous respectively. When sending updates to the GUI 106 from Logic 102, shcmd_Post( ) should always be used. This is because the GUI 106 often runs on its own thread, and all GUI 106 processing should be done on its own thread, not that of the Logic 102. The shcmd_Post( ) sends the update to the target on the applications main thread.

static void DestroyMyObj(MYOBJ*p)
 {
 feature_Destroy(p→tmr_feat);
 }

The feature_Destroy( ) function is called when the Shell 100 signals that this instance of the family should be destroyed. The application is then cleaned up by destroying the instantiated timer feature. The instance of MYOBJ will be de-allocated by the Shell 100.

--- static BOOL Action(family_INFO *pfamilyinfo, data_INFO *pdatainfo)
{
 MYOBJ  *p = pfamilyinfo->plogic;
 data_HANDLE  datahan = pdatainfo ? pdatainfo->datahan : NULL;

The Action function is called by GUI 106 each time an action is taken on Data 104. First, the family's instance of MYOBJ is obtained from the family info. Then the Data 104 handle is stored to the datahan that received the action. Actions are generally received by the Logic 102 when the GUI 106 is giving a signal from a widget that can not hold a value, such as a button click.

if (data_Valid(datahan) && p)
 {
 UINT32 val;
 switch(pdatainfo→id)
 {

The data_INFO::id is set to the index into the Data description array (Data Descriptor 110) of the Data 104 that received the action. The application can then act accordingly, depending on what Data 104 was modified.

case public_TESTBTN: // User clicked TEST BUTTON
 // Get value from this family member's Data and change
 val=1+data_GetVal32(pfamilyinfo→datahan[public_ONETWOTHREE], 0, NULL);

```
if (val>3)
{
val=1;
}
// Set new value for onetwothree   data_SetVal
(pfamilyinfo→datahan[public_ONETWOTHREE], val);
// Notify Shell
    shcmd_Post(pfamilyinfo→datahan[public_ONETWO-
THREE], shcmd_SRC_LOGIC, shcmd_DATA_UPDATE,
NULL, NULL);
    break;
    Similar to updating the counters, when the application gets
an action from a button click, the public_ONETWOTHREE
Data 104 is updated. Once the update occurs the GUI 106 is
told that the variable has been changed by calling shcmd_
Post( ).
    {
    }
    return TRUE;
    On success TRUE is returned.
```

```
static BOOL DataUpdate(family_INFO *pfamilyinfo,
data_INFO *pdatainfo)
{
    MYOBJ      *p = pfamilyinfo->plogic;
    data_HANDLE   datahan = pdatainfo ? pdatainfo->datahan : NULL;
```

When the GUI 106 updates one of the Data 104 elements, the application gets notification on the update (Shell Command Processor). Once again, the MYOBJ instance and the data_HANDLE are de-referenced from pfamilyinfo and pdatainfo, respectively.

```
    if (data_Valid(datahan) && p)
    {
    UINT32 val;
    switch(pdatainfo→id)
    {
```

Just as is the case with an action, datahan is the Data 104 object being modified.

```
    case public_MINITRK:
        // Get value of Data value that changed val=data_GetVal32
(datahan, 0, NULL);
        // Set new value for meter    data_SetVal
(pfamilyinfo→datahan[public_METER], val);
        // Notify Shell
        shcmd_Post(pfamilyinfo→datahan[public_METER],
shcmd_SRC_LOGIC, shcmd_DATA UPDATE, NULL,
NULL);
        break;
```

In this demonstration, when the GUI 106 notifies the Shell 100 that the mini tracker value has been changed, the Logic 102 updates the meter with the trackers value. The GUI 106 is once again notified of the change.

```
    }
    }
    return TRUE;
}
```

On success TRUE is returned:

```
static BOOL CreateFamily( shell_INFO   *pshellinfo,     //
                          family_INFO   *pfamilyinfo,   //
                          family_CALL   *pcall,          //
                          MYOBJ         *p)              //
{
```

The CreateFamily( ) function is called when the Shell 100 signals to Logic 102 that an instance of this family has been created. An instance is created as a result to family_Call( ) and the Shell 100 allocates room for the instance of MYOBJ. In this demonstration, a Data 104 object is initialized and the MYOBJ instance timer feature is created within the CreateFamily( ) function.

```
    data_SetPtr(pfamilyinfo→datahan[public_MYTEXT],
TEXT("Enter some text"));
    // Notify Shell
    shcmd_Post(pfamilyinfo→datahan[public_MYTEXT],
shcmd_SRC_LOGIC,  shcmd_DATA_UPDATE,  NULL,
NULL);
```

Initialize a string, and update the GUI 106.

```
{
    tmr_CREATE tc;
        // Create timer feature every 50 milliseconds
        tc.millisecs = 50;
        p->tmr_feat = feature_Create( pshellinfo->shellhan,
                        feature_TYP_TMR,
                        &tc,
                        NULL,
                        NULL,
                        (feature_CALLBACK *)TimerCallbackFn,
                        pfamilyinfo->familyhan);
}
        Create a timer feature.
    return TRUE;
}
```

Return TRUE on success.
Shell Command Processor

```
static BOOL FamilyProc( shell_INFO    *pshellinfo,    //
                        family_INFO   *pfamilyinfo,   //
                        data_INFO     *pdatainfo,     //
                        shcmd_SRC     src,             //
                        shcmd_CMD     cmd,             //
                        shell_PARAM   param1,          //
                        shell_PARAM   param2 )         //
```

The FamilyProc( ) function is called when the Shell 100 needs to signal and event on the family. The following parameters are passed:

shell_INFO—Reference to the Shell instance.
    family_INFO—Reference to this instance of the family.
        On family creation, family_INFO::plogic is allocated by the Shell 100.
    data_INFO—Reference to the affected Data 104 on shcmd_DATA_UPDATE and shcmd_DATA_ACTION.
    shcmd_SRC—Who caused this component to change, who is providing notification.
    shcmd_CMD—The notification command or being called.

shell_PARAM—Family specific parameter. This is especially useful on a shcmd_FAMILY_INIT, that occurs due to a family_Call( ). The caller can send the application any kind of information to be used as parameters to the constructor of the family instance.

```
{
  BOOL      rv = TRUE;
  MYOBJ     *p = pfamilyinfo->plogic;
  family_CALL *pcall;
  switch(cmd)
  {
    case shcmd_FAMILY_KILL:
      DestroyMyObj(p);
      break;
    case shcmd_FAMILY_INIT:
      pcall = (family_CALL *)param1;
      CreateFamily(pshellinfo, pfamilyinfo, pcall, p);
      break;
    case shcmd_FAMILY_NOTIFY:
      break;
    case shcmd_DATA_UPDATE:
      DataUpdate(pfamilyinfo, pdatainfo);
      break;
    case shcmd_DATA_ACTION:
      Action(pfamilyinfo, pdatainfo);
      break;
    case shcmd_DATA_REFRESH:
      break;
  }
}
```

The appropriate function is called for each one of the events. These events are discussed in further in the template documentation—Responding to events.

void DWExit(dllfile_INFO*pdllinfo)
{
}

The DWExit( ) function is called when the library is unloaded. No action needs to be taken for this demonstration.

```
UINT32 DWMain( dllfile_INFO *pdllinfo, shell_INFO *pshellinfo)
{
  BOOL     rv = FALSE;
  family_CREATE  c;
  feature_HANDLE featurehan;
  ZeroMemory(&c, sizeof(c));
```

The DWMain( ) function is the entry point to the DLL for Logic 102. DWMain( ) is called when the DLL is loaded by the Shell application. At this point, the plug-in needs to create a family feature. By creating a family feature, the plug-in is registering a family that will be able to be instantiated by calls to family_Call( ).

c.lgcproc=FamilyProc;

First, the pointer is set to the function that will process all of the Shell 100 commands.

c.moduleowner=pdllinfo→moduleowner;

Set the moduleowner to the dllfile_INFO::moduleowner. This binds the family to the DLL, so the Shell 100 can signal the family when the DLL is unloaded.

Setting this value to NULL will tell the Shell 100 that the main application is the owner of this family.

c.pdatadesc=objectlist;

c.count=$ARRAY_{13}LEN$(objectlist);

The Data description array (Data Descriptor 110) is given along with its length as parameters so the Shell 100 can create instances of the actual Data 104 from their descriptions.

c.sizeoflgc=sizeof(MYOBJ);

Finally, the family is told how large its private information is. The Shell 100 allocates this memory for the application, and MYOBJ is returned as family_INFO::plogic. When the Shell 100 destroys the family instance, this memory is deallocated by the Shell 100.

```
  featurehan = feature_Create( pshellinfo->shellhan,
                  feature_TYP_FAMILY,
                  &c,
                  public_MyModuleName,
                  &public_GUID_MYFAMILY,
                  NULL, NULL );
  // Must include the symbol _dll_GetVersion of important module won't link
  return (featurehan != feature_HANDLE_INVALID) ? dll_GetVersion( ) : FALSE;
}
```

The feature_Create( ) is then called, to create the family feature. The family is assigned a unique name and GUID.

shcmd_SRC DWModuleType(const WCHAR **modulename)

{

*modulename=L"MyCustomModule-LOGIC";

return shcmd_SRC_LOGIC; }

The function exported by the DLL lets the Shell 100 know what type of module it is. Logic module 102 automatically converts all shcmd_Send( ) commands to shcmd_Post( ).

Plug-in GUI 106

The following code represents an exemplary complete source file for an exemplary GUI module 106:

```
00001   /*******************************************************************
00002   File:       gui.c
00003   Version:    1.0
00004   Copyright:  2004 DiamondWare, Ltd.
00005   Written:    by R. Mathieu
00006   Project:
00007   Purpose:
00008   History:
00009   *******************************************************************/
00010
00011   #define INITGUID
00012   #define INSIDE_DLL
00013
00014
/*===========================================================
00015                   INCLUDES
00016
===========================================================*/
00017   #define WIN32_LEAN_AND_MEAN
00018   #include <windows.h>
00019
00020   #include "shell\shell.h"
00021   #include "plugins\ctls\gui\ctls.h"
00022
00023   #include "..\mylogic\public.h"
00024
00025   #include "resource.h"
00026
00027
/*===========================================================
00028                   PRAGMAS
00029
===========================================================*/
00030
00031   #pragma comment(linker, "/OPT:NOWIN98")    // Exclude Windows 98
Smaller build
00032
00033
/*===========================================================
00034                   DEFINES
00035
===========================================================*/
00036   #define MAGIC        '1234'
00037
00038
00039   typedef struct
00040   {
00041     HWND            hWnd;
00042
00043     feature_HANDLE  text_title;
00044     feature_HANDLE  trk_title;
00045     feature_HANDLE  val_title;
00046
00047     feature_HANDLE  text_stts;
00048     feature_HANDLE  trk_stts;
00049     feature_HANDLE  val_stts;
00050
00051   } MYOBJ;
00052
00053
/*===========================================================
00054                   DATA
00055
===========================================================*/
00056
00057
00058
/*===========================================================
00059                   CODE
00060
===========================================================*/
00061
00062   /*--------------------------------------------------------------------
00063     Main Dialog Callback
00064   --------------------------------------------------------------------*/
00065   static BOOL CALLBACK DialogProc( HWND hWnd, UINT uMsg,
WPARAM wParam, LPARAM lParam )
00066   {
00067     family_HANDLE familyhan;
00068
```

```
00069       switch( uMsg )
00070       {
00071       case WM_COMMAND:
00072
00073          // Dereference hWnd to get family
00074          familyhan = (family_HANDLE) GetWindowLong(hWnd, DWL_USER);
00075          if (familyhan)
00076          {
00077             family_INFO familyinfo;
00078
00079             // Get family's information
00080             if (family_GetInfo(familyhan, &familyinfo))
00081             {
00082                MYOBJ     *p = familyinfo.pgui;
00083
00084                switch(LOWORD(wParam))
00085                {
00086                case IDC_MYTEXT:
00087
00088                   if ((HIWORD(wParam) == EN_CHANGE))
00089                   {
00090                      WCHAR buf[256];
00091
00092                      GetWindowText((HWND)lParam, buf, 256);
00093                      data_Sprintf( familyinfo.datahan[public_MYTEXT], buf );
00094
00095                      // Notify Shell that content are changed
00096                      shcmd_Send(familyinfo.datahan[public_MYTEXT],
shcmd_SRC_GUI, shcmd_DATA_UPDATE, NULL, NULL);
00097
00098                      // Invalidate GUI
00099                      shell_Invalidate(familyinfo.shellhan, p->text_title, FALSE);
00100                      shell_Invalidate(familyinfo.shellhan, p->text_stts, FALSE);
00101                   }
00102
00103                   break;
00104
00105                case IDC_TESTBUTTON:
00106                   // Notify Shell
00107                   shcmd_Send(familyinfo.datahan[public_TESTBTN],
shcmd_SRC_GUI, shcmd_DATA_ACTION, NULL, NULL);
00108                   break;
00109                }
00110             }
00111          }
00112
00113          break;
00114
00115       case WM_INITDIALOG:
00116          return TRUE;
00117
00118       case WM_DESTROY:
00119          break;
00120
00121       case WM_CLOSE:
00122          break;
00123       }
00124
00125       return shell_DefaultMessageHandler(hWnd, uMsg, wParam, lParam);
00126    }
00127
00128    /*-----------------------------------------------------------------------
00129       Destroy GUI family reference object
00130    -----------------------------------------------------------------------*/
00131    static void DestroyFamily(family_INFO *pfamilyinfo)
00132    {
00133       if (pfamilyinfo)
00134       {
00135          MYOBJ *p = pfamilyinfo->pgui;
00136
00137          feature_Destroy(p->text_title);
00138          feature_Destroy(p->trk_title);
00139          feature_Destroy(p->val_title);
00140
00141          feature_Destroy(p->text_stts);
00142          feature_Destroy(p->trk_stts);
00143          feature_Destroy(p->val_stts);
00144
00145          if (IsWindow(p->hWnd))
00146          {
```

-continued

```
00147            DestroyWindow(p->hWnd);
00148          }
00149
00150          if (shell_Valid(pfamilyinfo->shellhan) != NULL)
00151          {
00152              // Remove from Shell if the Shell still exists
00153              shell_RemovehWnd(pfamilyinfo->shellhan, p->hWnd); // Remove
Shell message manager
00154          }
00155       }
00156    }
00157
00158
00159    /*------------------------------------------------------------------------
00160    ------------------------------------------------------------------------*/
00161    static BOOL FeatureCBFn(feature_REASON reason, feature_INFO
*pfeatureinfo, family_HANDLE familyhan)
00162    {
00163       if (reason == feature_REASON_NEEDINFO)
00164       {
00165          family_INFO     familyinfo;
00166
00167          if (family_GetInfo(familyhan, &familyinfo))
00168          {
00169             MYOBJ    *p = familyinfo.pgui;
00170
00171             if (pfeatureinfo->featurehan == p->text_title)
00172             {
00173                static WCHAR buf[256];
00174
00175                _snwprintf(buf, 256, TEXT("[%s]"),
data_Get(familyinfo.datahan[public_MYTEXT], 0, NULL));
00176                pfeatureinfo->title->text = buf;
00177             }
00178             else if (pfeatureinfo->featurehan == p->trk_title)
00179             {
00180                static WCHAR buf[256];
00181
00182                _snwprintf(buf, 256, TEXT("[Trk: %d]"),
data_GetVal32(familyinfo.datahan[public_MINITRK], 0, NULL));
00183                pfeatureinfo->title->text =buf;
00184             }
00185             else if (pfeatureinfo->featurehan == p->val_title)
00186             {
00187                static WCHAR buf[256];
00188
00189                _snwprintf(buf, 256, TEXT("Val: %d"),
data_GetVal32(familyinfo.datahan[public_COUNTER], 0, NULL));
00190                pfeatureinfo->title->text = buf;
00191             }
00192             else if (pfeatureinfo->featurehan == p->text_stts)
00193             {
00194                static WCHAR buf[256];
00195
00196                _snwprintf(buf, 256, TEXT("%s"),
data_Get(familyinfo.datahan[public_MYTEXT], 0, NULL));
00197                pfeatureinfo->stts->text = buf;
00198             }
00199             else if (pfeatureinfo->featurehan == p->trk_stts)
00200             {
00201                static WCHAR buf[256];
00202
00203                _snwprintf(buf, 256, TEXT("Trk: %d"),
data_GetVal32(familyinfo.datahan[public_MINITRK], 0, NULL));
00204                pfeatureinfo->stts->text = buf;
00205             }
00206             else if (pfeatureinfo->featurehan == p->val_stts)
00207             {
00208                static WCHAR buf[256];
00209
00210                _snwprintf(buf, 256, TEXT("Val: %d"),
data_GetVal32(familyinfo.datahan[public_COUNTER], 0, NULL));
00211                pfeatureinfo->stts->text = buf;
00212             }
00213
00214
00215          }
00216       }
00217
00218       return TRUE;
```

-continued

```
00219    }
00220
00221    /*------------------------------------------------------------------
00222        Create GUI family reference object
00223    ------------------------------------------------------------------*/
00224    static BOOL CreateFamily(family_INFO *pfamilyinfo, shell_INFO *pshellinfo)
00225    {
00226        BOOL            rv = FALSE;
00227        MYOBJ           *p = pfamilyinfo->pgui;
00228
00229        p->hWnd = CreateDialog(dll_GetInstance( ),
MAKEINTRESOURCE(IDD_MYDLG), pshellinfo->hWnd, DialogProc);
00230
00235    else
00236    {
00237        stts_CREATE   sc;
00238        title_CREATE  tc;
00239
00240        ZeroMemory(&sc, sizeof(sc));
00241        ZeroMemory(&tc, sizeof(tc));
00242
00243        shell_AddhWnd(pshellinfo->shellhan, p->hWnd);
00244        SetWindowLong(p->hWnd, DWL_USER, (LONG)pfamilyinfo->familyhan);
00245
00246        tc.reserved = 0;
00247        p->text_title = feature_Create(pshellinfo->shellhan,   // Shell handle
00248                         feature_TYP_TITLE,   // Type
00249                         &tc,                 // Create
00250                         NULL,                // Name
00251                         NULL,                // GUID
00252                         (feature_CALLBACK *)FeatureCBFn,
00253                         pfamilyinfo->familyhan );
00254
00255        tc.reserved = 0;
00256        p->trk_title = feature_Create(pshellinfo->shellhan,    // Shell handle
00257                         feature_TYP_ TITLE,  // Type
00258                         &tc,                 // Create
00259                         NULL,                // Name
00260                         NULL,                // GUID
00261                         (feature_CALLBACK *)FeatureCBFn,
00262                         pfamilyinfo->familyhan );
00263
00264        tc.reserved = 0;
00265        p->val_title = feature_Create(pshellinfo->shellhan,    // Shell handle
00266                         feature_TYP_TITLE,   // Type
00267                         &tc,                 // Create
00268                         NULL,                // Name
00269                         NULL,                // GUID
00270                         (feature_CALLBACK *)FeatureCBFn,
00271                         pfamilyinfo->familyhan );
00272
00273
00274        sc.width = 300;
00275        p->text_stts = feature_Create(pshellinfo->shellhan,    // Shell handle
00276                         feature_TYP_ STTS,   // Type
00277                         &sc,                 // Create
00278                         NULL,                // Name
00279                         NULL,                // GUID
00280                         (feature_CALLBACK *)FeatureCBFn,
00281                         pfamilyinfo->familyhan );
00282
00283        sc.width = 50;
00284        p->trk_stts = feature_Create( pshellinfo->shellhan,    // Shell handle
00285                         feature_TYP_STTS,    // Type
00286                         &sc,                 // Create
00287                         NULL,                // Name
00288                         NULL,                // GUID
00289                         (feature_CALLBACK *)FeatureCBFn,
00290                         pfamilyinfo->familyhan );
00291
00292        sc.width = 50;
00293        p->val_stts = feature_Create( pshellinfo->shellhan,    // Shell handle
00294                         feature_TYP_STTS,    // Type
00295                         &sc,                 // Create
00296                         NULL,                // Name
00297                         NULL,                // GUID
00298                         (feature_CALLBACK *)FeatureCBFn,
00299                         pfamilyinfo->familyhan );
```

```
00300
00301
00302
00303
00304      rv = TRUE;
00305    }
00306
00307    if (rv == FALSE && p != NULL)
00308    {
00309      DestroyFamily(pfamilyinfo);
00310    }
00311
00312    return rv;
00313  }
00314
00315  /*------------------------------------------------------------------------
00316     Update Data object GUI control
00317  ------------------------------------------------------------------------*/
00318  static BOOL DataUpdate(family_INFO *pfamilyinfo, data_INFO
*pdatainfo)
00319  {
00320    BOOL           rv = FALSE;
00321    MYOBJ          *p = pfamilyinfo->pgui;
00322    data_HANDLE datahan = pdatainfo ? pdatainfo->datahan : NULL;
00323
00324    if (pfamilyinfo == NULL)
00325    {
00326      // DataInit( ) - pfamilyinfo cannot be NULL
00327    }
00328    else if (datahan == NULL)
00329    {
00330      // DataInit( ) - Invalid Data handle object
00331    }
00332    else
00333    {
00334      UINT32 r1, r2, r3;
00335
00336      switch(pdatainfo->id)
00337      {
00338      case public_MYTEXT:
00339        SetDlgItemText(p->hWnd, IDC_MYTEXT, data_Get(datahan, 0,
NULL));
00340        break;
00341
00342      case public_METER:
00343        // Invalidate features that relate to the state of this value
00344        shell_Invalidate(pfamilyinfo->shellhan, p->trk_title, FALSE);
00345        shell_Invalidate(pfamilyinfo->shellhan, p->trk_stts, FALSE);
00346        break;
00347
00348      case public_COUNTER:
00349
00350        SetDlgItemInt(p->hWnd, IDC_VALUE, data_GetVal32(datahan, 0,
NULL), FALSE);
00351
00352        // Invalidate features that relate to the state of this value
00353        shell_Invalidate(pfamilyinfo->shellhan, p->val_title, FALSE);
00354        shell_Invalidate(pfamilyinfo->shellhan, p->val_stts, FALSE);
00355        break;
00356
00357      case public_ONETWOTHREE:
00358
00359        // Check appropriate box
00360        r1 = r2 = r3 = BST_UNCHECKED;
00361        switch(data_GetVal32(datahan, 0, NULL))
00362        {
00363        case 1:
00364          r1 = BST_CHECKED;
00365          break;
00366
00367        case 2:
00368          r2 = BST_CHECKED;
00369          break;
00370
00371        case 3:
00372          r3 = BST_CHECKED;
00373          break;
00374        }
00375
00376        SendDlgItemMessage(p->hWnd, IDC_RADIO_ONE,
```

```
                    BM_SETCHECK, r1, 0);
00377              Send DIgItemMessage(p->hWnd, IDC_RADIO_TWO,
                    BM_SETCHECK, r2, 0);
00378              SendDIgItemMessage(p->hWnd, IDC_RADIO_THREE,
                    BM_SETCHECK, r3, 0);
00379
00380              break;
00381          }
00382
00383          rv = TRUE;
00384       }
00385
00386       return rv;
00387   }
00388
00389   /*------------------------------------------------------------------------
00390        Initialize data_HANDLE object with gui reference information, hWnd,
          ctl,...
00391   ------------------------------------------------------------------------*/
00392   static BOOL DataInit(family_INFO *pfamilyinfo, data_INFO *pdatainfo)
00393   {
00394       BOOL           rv = FALSE;
00395       MYOBJ          *p = pfamilyinfo->pgui;
00396       data_HANDLE datahan = pdatainfo ? pdatainfo->datahan : NULL;
00397
00398       if (pfamilyinfo == NULL)
00399       {
00400          // DataInit( ) - pfamilyinfo cannot be NULL
00401       }
00402       else if (datahan == NULL)
00403       {
00404          // DataInit( ) - Invalid Data handle object
00405       }
00406       else
00407       {
00408          HWND           hWndControl;
00409
00410          switch(pdatainfo->id)
00411          {
00412          case public_MINITRK:
00413              hWndControl = GetDIgItem(p->hWnd, IDC_MINITRK);
00414              ctl_Bind(dll_GetInstance( ), &ctltrack_GUID, hWndControl, datahan,
                    NULL, NULL);
00415              break;
00416
00417          case public_METER:
00418              hWndControl = GetDIgItem(p->hWnd, IDC_METER1);
00419              ctl_Bind(dll_GetInstance( ), &ctlmeter_GUID, hWndControl, datahan,
                    NULL, NULL);
00420              break;
00421
00422          case public_COUNTER2:
00423              hWndControl = GetDIgItem(p->hWnd, IDC_METER2);
00424              ctl_Bind(dll_GetInstance( ), &ctlmeter_GUID, hWndControl, datahan,
                    NULL, NULL);
00425              break;
00426          }
00427
00428          rv = TRUE;
00429       }
00430
00431       return rv;
00432   }
00433
00434   /*------------------------------------------------------------------------
00435        Show/Hide family
00436   ------------------------------------------------------------------------*/
00437   static void ShowFamily(family_INFO *pfamilyinfo, BOOL visible)
00438   {
00439       if (pfamilyinfo)
00440       {
00441          MYOBJ    *p = pfamilyinfo->pgui;
00442          ShowWindow(p->hWnd, (visible == FALSE) ? SW_HIDE :
                    SW_SHOW);
00443       }
00444   }
00445
00446   /*------------------------------------------------------------------------
00447   ------------------------------------------------------------------------*/
00448   static BOOL FamilyProc( shell_INFO    *pshellinfo,    //
```

-continued

```
                    family_INFO    *pfamilyinfo,    //
                    data_INFO      *pdatainfo,      //
                    shcmd_SRC      src,             //
                    shcmd_CMD      cmd,             //
                    shell_PARAM    param1,          //
                    shell_PARAM    param2 )         //
{
   BOOL rv = FALSE;

if (pfamilyinfo)
   {
      MYOBJ      *p = pfamilyinfo->plogic;

switch(cmd)
      {
      case shcmd_FAMILY_INIT:
         CreateFamily(pfamilyinfo, pshellinfo);
         break;

case shcmd_FAMILY_KILL:
         DestroyFamily(pfamilyinfo);
         break;

case shcmd_FAMILY_POS:
         break;

case shcmd_FAMILY_SHOW:
         ShowFamily(pfamilyinfo, ((BOOL)param1));
         break;

case shcmd_FAMILY_FOCUS:
         break;

case shcmd_DATA_FOCUS:
         break;

case shcmd_DATA_INIT:
         DataInit(pfamilyinfo, pdatainfo);
         break;

case shcmd_DATA_KILL:
         break;

case shcmd_LIST_ADD:
         break;

case shcmd_LIST_REM:
         break;

case shcmd_LIST_RESET:
         break;

case shcmd_CTL_POS:
         break;

case shcmd_CTL_SHOW:
         break;

case shcmd_CTL_COLOR:
         break;

case shcmd_CTL_IOCTL:
         break;

case shcmd_DATA_UPDATE:
         DataUpdate(pfamilyinfo, pdatainfo);
         break;

case shcmd_LIST_SEL:
         break;

case shcmd_LIST_UPD:
         break;
      } rv = TRUE;
   } return rv;
}
```

-continued

```
00529
00530    /*-------------------------------------------------------------
00531    -------------------------------------------------------------*/
00532    UINT32 DWMain( dllfile_INFO *pdllinfo, shell_INFO *pshellinfo)
00533    {
00534        BOOL    rv = FALSE;
00535
00536        ctl_InitInstance(pshellinfo->shellhan, dll_GetInstance( ),
&ctlmeter_GUID);
00537        ctl_InitInstance(pshellinfo->shellhan, dll_GetInstance( ), &ctltrack_GUID);
00538
00539        rv = family_BindGUIByGUID(pshellinfo->shellhan,
&public_GUID_MYFAMILY, FamilyProc, sizeof(MYOBJ));
00540
00541        // Must include the symbol _dll_GetVersion of important module won't
link
00542        return (rv) ? dll_GetVersion( ) : FALSE;
00543    }
00544
00545    /*-------------------------------------------------------------
00546    -------------------------------------------------------------*/
00547    void DWExit(dllfile_INFO *pdllinfo)
00548    {
00549    }
00550
00551    /*-------------------------------------------------------------
00552    -------------------------------------------------------------*/
00553    shcmd_SRC DWModuleType(const WCHAR **modulename)
00554    {
00555        *modulename = L"MyCustomModule-GUI";
00556        return shcmd_SRC_GUI;
00557    }
00558
```

The DWMain Function

The DWMain function, as well as binding the GUI 106 to the family, also initializes the control module that was loaded as a plug-in earlier in the main module.

```
UINT32 DWMain(dllfile_INFO *pdllinfo, shell_INFO *pshellinfo)
{
  BOOL ry=FALSE;
  ctl_InitInstance(pshellinfo->shellhan, dll_GetInstance( )
&ctlmeter_GUID);
  ctl_InitInstance(pshellinfo->shellhan, dll_GetInstance( )
&ctltrack_GUID);
  ry=family_BindGUIByGUID(pshellinfo->shellhan,
&public_GUID_MYFAMILY,  FamilyProc,   sizeof
(MYOBJ));
  //Must include the symbol_dll_GetVersion of important
module won't link return (rv) ? dll_GetVersion( ): FALSE;
}
```

The FamilyProc Function

In this case, the FamilyProc function calls several commands and dispatches them to a number of functions:

shcmd_FAMILY_INIT calls The CreateFamily Function
shcmd_FAMILY_KILL calls The DestroyFamily function
shcmd_FAMILY_SHOW calls The ShowFamily function
shcmd_DATA_INIT calls The DataInit Function
shcmd_DATA_UPDATE calls The DataUpdate function The CreateFamily Function The CreateFamily Function is a function that creates the GUI 106.

```
static BOOL CreateFamily(family_INFO *pfamilyinfo, shell_INFO *pshellinfo)
{
  BOOL    rv = FALSE;
  MYOBJ   *p = pfamilyinfo->pgui;
  p->hWnd = CreateDialog(dll_GetInstance( ),
MAKEINTRESOURCE(IDD_MYDLG), pshellinfo->hWnd, DialogProc);
  if (p->hWnd == NULL)
  {
    // Error creating dialog window
  }
  else
  {
    stts_CREATE   sc;
    title_CREATE tc;
    ZeroMemory(&sc, sizeof(sc));
    ZeroMemory(&tc, sizeof(tc));
    shell_AddhWnd(pshellinfo->shellhan, p->hWnd);
    SetWindowLong(p->hWnd, DWL_USER, (LONG)pfamilyinfo->familyhan);
    tc.reserved = 0;
    p->text_title = feature_Create(pshellinfo->shellhan,    // Shell handle
                        feature_TYP_TITLE,   // Type
                        &tc,             // Create
```

```
                    NULL,           // Name
                    NULL,           // GUID
                    (feature_CALLBACK *)FeatureCBFn,
                    pfamilyinfo->familyhan );
    tc.reserved = 0;
    p->trk_title = feature_Create(pshellinfo->shellhan,  // Shell handle
                    feature_TYP_TITLE,   // Type
                    &tc,            // Create
                    NULL,           // Name
                    NULL,           // GUID
                    (feature_CALLBACK *)FeatureCBFn,
                    pfamilyinfo->familyhan );
    tc.reserved = 0;
    p->val_title = feature_Create(pshellinfo->shellhan,  // Shell handle
                    feature TYP_TITLE,   // Type
                    &tc,            // Create
                    NULL,           // Name
                    NULL,           // GUID
                    (feature_CALLBACK *)FeatureCBFn,
                    pfamilyinfo->familyhan );
    sc.width = 300;
    p->text_stts = feature Create(pshellinfo->shellhan,  // Shell handle
                    feature_TYP_STTS,    // Type
                    &sc,            // Create
                    NULL,           // Name
                    NULL,           // GUID
                    (feature_CALLBACK *)FeatureCBFn,
                    pfamilyinifo->familyhan );
    sc.width = 50;
    p->trk_stts = feature_Create( pshellinfo->shellhan,  // Shell handle
                    feature_TYP_STTS,    // Type
                    &sc,            // Create
                    NULL,           // Name
                    NULL,           // GUID
                    (feature_CALLBACK *)FeatureCBFn,
                    pfamilyinfo->familyhan );
    sc.width = 50;
    p->val_stts = feature_Create( pshellinfo->shellhan,  // Shell handle
                    feature_TYP_STTS,    // Type
                    &sc,            // Create
                    NULL,           // Name
                    NULL,           // GUID
                    (feature_CALLBACK *)FeatureCBFn,
                    pfamilyinfo->familyhan );
    rv = TRUE;
  }
  if (rv == FALSE && p != NULL)
  {
     DestroyFamily(pfamilyinfo);
  }
  return rv;
}
```

The main window is a modeless dialog created via the CreateDialog function:

p->hWnd=CreateDialog(dll_GetInstance( ), MAKEINTRESOURCE(IDD_MYDLG), pshellinfo->hWnd, DialogProc);

The dialog is defined in the resource file. Some of the controls, notably the tracker and the two VU meters, are defined as custom controls using specific window class names defined in the control module.

After the window is successfully created, the window handle is registered with the Shell 100, and a family handle is stored with the window via Windows' SetWindowLong:

shell_AddhWnd(pshellinfo->shellhan, p->hWnd);

SetWindowLong(p->hWnd, DWL_USER, (LONG) pfamilyinfo->familyhan);

Additionally, the Demo3 GUI 106 creates a number of features that allow the GUI 106 to access some elements of the Shell's main window.

First, the GUI 106 creates three (3) title features:

```
tc.reserved = 0;
p->text_title = feature_Create(pshellinfo->shellhan,  // Shell handle
                feature_TYP_TITLE,   // Type
                &tc,            // Create
                NULL,           // Name
                NULL,           // GUID
                (feature CALLBACK *)FeatureCBFn,
                pfamilyinfo->familyhan );
tc.reserved = 0;
p->trk_title = feature_Create(pshellinfo->shellhan,  // Shell handle
                feature_TYP_TITLE,   // Type
                &tc,            // Create
                NULL,           // Name
                NULL,           // GUID
                (feature_CALLBACK *)FeatureCBFn,
                pfamilyinfo->familyhan );
tc.reserved = 0;
p->val_title = feature_Create(pshellinfo->shellhan,  // Shell handle
                feature_TYP_TITLE,   // Type
                &tc,            // Create
```

```
                    NULL,           // Name
                    NULL,           // GUID
                    (feature_CALLBACK *)FeatureCBFn,
                    pfamilyinfo->familyhan );
```

There is no limit to the number of title features that can be created. The Shell 100 will simply concatenate the text for all of the title features to arrive at the text that will be displayed in the title bar.

Next, three (3) status fields are created:

```
sc.width = 300;
p->text_stts = feature_Create(pshellinfo->shellhan,    // Shell handle
                    feature_TYP_STTS,  // Type
                    &sc,            // Create
                    NULL,           // Name
                    NULL,           // GUID
                    (feature_CALLBACK *)FeatureCBFn,
                    pfamilyinfo->familyhan );
sc.width = 50;
p->trk_stts = feature_Create( pshellinfo->shellhan,   // Shell handle
                    feature_TYP_STTS,  // Type
                    &sc,            // Create
                    NULL,           // Name
                    NULL,           // GUID
                    (feature_CALLBACK *)FeatureCBFn,
                    pfamilyinfo->familyhan );
sc.width = 50;
p->val_stts = feature_Create( pshellinfo->shellhan,   // Shell handle
                    feature_TYP_STTS,  // Type
                    &sc,            // Create
                    NULL,           // Name
                    NULL,           // GUID
                    (feature_CALLBACK *)FeatureCBFn,
                    pfamilyinfo->familyhan );
```

These status features create status fields for the status bar on the bottom of the Shell's window. The stts_CREATE:: width field needs to be initialized to set the width, in pixels, of each status field.

The ShowFamily Function

In response to the shcmd_FAMILY_SHOW command, the program calls the windows ShowWindow function to display the GUI 106:

```
    static void ShowFamily(family_INFO *pfamilyinfo,
BOOL visible)
    {
    if (pfamilyinfo)
    MYOBJ *p=pfamilyinfo->pgui;
    ShowWindow(p->hWnd, (visible==FALSE) ? SW_HIDE : SW_SHOW);
    }
    }
```

The DataInit Function

The GUI 106 receives a shcmd_DATA_INIT command for every Data 104 item in order to give the GUI 106 a chance to initialize items that correspond to each Data 104 item at the appropriate time. In the present case, the program will make use of the provided control wrappers to achieve an automatic information exchange between these controls and the Logic module 102.

```
static BOOL DataInit(family_INFO *pfamilyinfo, data_INFO *pdatainfo)
{
    BOOL    rv = FALSE;
    MYOBJ   *p = pfamilyinfo->pgui;
    data_HANDLE datahan = pdatainfo ? pdatainfo->datahan : NULL;
    if (pfamilyinfo == NULL)
    {
        // DataInit( ) - pfamilyinfo cannot be NULL
    }
    else if (datahan == NULL)
    {
        // DataInit( ) - Invalid Data handle object
    }
    else
    {
        HWND      hWndControl;
        switch(pdatainfo->id)
        {
        case public_MINITRK:
            hWndControl = GetDIgItem(p->hWnd, IDC_MINITRK);
            ctl_Bind(dll_GetInstance( ), &ctltrack_GUID, hWndControl,
datahan, NULL, NULL);
            break;
        case public_METER:
            hWndControl = GetDIgItem(p->hWnd, IDC_METER1);
            ctl_Bind(dll_GetInstance( ), &ctlmeter_GUID, hWndControl,
datahan, NULL, NULL);
            break;
        case public_COUNTER2:
            hWndControl = GetDIgItem(p->hWnd, IDC_METER2);
            ctl_Bind(dll_GetInstance( ), &ctlmeter_GUID, hWndControl,
datahan, NULL, NULL);
            break;
        }
        rv = TRUE;
    }
    return rv;
}
```

This is accomplished by calling the ctl_Bind with the DLL instance, the GUID for the control type, the Data handle, and the window handle of the control to bind:

hWndControl=GetDIgItem(p->hWnd, IDC_MINITRK);
    ctl_Bind(dll_GetInstance( ), &ctltrack_GUID, hWndControl, datahan, NULL, NULL);

Once this is done, Shell commands associated with the Data item will be sent directly to the control wrappers in order to achieve an automatic information exchange.

The FeatureCBFn Function

The FeatureCBFn Function is the callback function registered using feature_Create for the Shell features created in The CreateFamily Function above. In the present case, the program will respond to the feature_REASON_NEEDINFO reason parameter to provide text for the created features. When these Shell features are about to be drawn, the callback function will be called.

```
static BOOL FeatureCBFn(feature_REASON reason, feature_INFO
*pfeatureinfo, family_HANDLE familyhan)
{
    if (reason == feature_REASON_NEEDINFO)
    {
        family_INFO    familyinfo;
        if (family_GetInfo(familyhan, &familyinfo))
        {
            MYOBJ   *p = familyinfo.pgui;
            if (pfeatureinfo->featurehan == p->text_title)
            {
                static WCHAR buf[256];
                _snwprintf(buf, 256, TEXT("[%s]"),
data_Get(familyinfo.datahan[public_MYTEXT], 0, NULL));
                pfeatureinfo->title->text = buf;
            }
            else if (pfeatureinfo->featurehan == p->trk_title)
            {
                static WCHAR buf[256];
```

-continued

```
        _snwprintf(buf, 256, TEXT("[Trk: %d]"),
data_GetVal32(familyinfo.datahan[public_MINITRK], 0, NULL));
        pfeatureinfo->title->text = buf;
      }
      else if (pfeatureinfo->featurehan == p->val_title)
      {
        static WCHAR buf[256];
        _snwprintf(buf, 256, TEXT("Val: %d"),
data_GetVal32(familyinfo.datahan[public_COUNTER], 0, NULL));
        pfeatureinfo->title->text = buf;
      }
      else if (pfeatureinfo->featurehan == p->text_stts)
      {
        static WCHAR buf[256];
        _snwprintf(buf, 256, TEXT("%s"),
data_Get(familyinfo.datahan[public_MYTEXT], 0, NULL));
        pfeatureinfo->stts->text = buf;
      }
      else if (pfeatureinfo->featurehan == p->trk_stts)
      {
        static WCHAR buf[256];
        _snwprintf(buf, 256, TEXT("Trk: %d"),
data_GetVal32(familyinfo.datahan[public_MINITRK], 0, NULL));
        pfeatureinfo->stts->text = buf;
      }
      else if (pfeatureinfo->featurehan == p->val_stts)
      {
        static WCHAR buf[256];
        _snwprintf(buf, 256, TEXT("Val: %d"),
data_GetVal32(familyinfo.datahan[public_COUNTER], 0, NULL));
        pfeatureinfo->stts->text = buf;
      }
    }
  }
  return TRUE;
}
```

First, a family_INFO struct (as used in the C language) is obtained from the family_HANDLE passed to the function:

family_INFO familyinfo;
    if (family_GetInfo(familyhan, &familyinfo))

If this succeeds, the program can get the MYOBJ pointer from the family info struct and compare the feature handle that was passed to the function with the feature handles set aside during feature creation to determine which feature actually needs info:

MYOBJ *p=familyinfo.pgui;
    if (pfeatureinfo->featurehan==p->text_title)
    {
    static WCHAR buf[256];
    _snwprintf(buf, 256, TEXT("[% s]"),
      data_Get(familyinfo.datahan[public_MYTEXT], 0, NULL));
    pfeatureinfo->title->text=buf;
    }

A pointer to the text being returned will be set in the feature type specific portion of the feature_INFO structure obtained earlier. This will point to statically allocated buffers that have been defined for each feature.

The DialogProc Function

The DialogProc function is the normal Windows callback function for dialog boxes, specified in The CreateFamily function during the call to CreateDialog.

The InitDialog function primarily contains a WM_COMMAND handler, which will be discussed herein. Other notable features are that the DialogProc function returns TRUE for the WM_INITDIALOG message, and calls the Shell's default message handler for messages that the DialogProc function does not process: shell_DefaultMessageHandler.

case WM_INITDIALOG:
      return TRUE;
    case WM_CLOSE:
      break;
    }
    return shell_DefaultMessageHandler(hWnd, uMsg, wParam, lParam);
    }

The WM_COMMAND handler illustrates direct communications with the Logic module 102 by modifying some Data 104 values and sending some shcmds in response to user manipulation of Windows controls in the dialog that have not been bound directly to the Data 104.

The first thing done in the command handler is to obtain the family_INFO structure from the family_HANDLE that has been stored with the window via SetWindowLong:

case WM_COMMAND:
    // Dereference hWnd to get family
    familyhan=(family_HANDLE)GetWindowLong(hWnd, DWL_USER);
    if (familyhan)
    {
    family_INFO familyinfo;
    // Get family's information
    if (family_GetInfo(familyhan, &familyinfo))
    {

Next, two events are checked for: an EN_CHANGE notification from the edit box, and a BN_CLICKED notification from the button.

In response to the EN_CHANGE notification from the edit box, the changed text is obtained and assigned to the public_MYTEXT Data 104 item before sending a shcmd_DATA_UPDATE command to the Logic module 102:

WCHAR buf[256];
    GetWindowText((HWND)lParam, buf, 256);
    data_Sprintf(familyinfo.datahan[public_MYTEXT], buf);
    // Notify Shell that content are changed
    shcmd_Send(familyinfo.datahan[public_MYTEXT], shcmd_SRC_GUI, shcmd_DATA_UPDATE, NULL, NULL);

The GUI 106 also displays the content of the public_MYTEXT data item in two Shell features: a title feature and a status bar feature. To reflect the change to this data item, these Shell features are invalidated in order to force them to redraw with the new content:

// Invalidate GUI
    shell_Invalidate(familyinfo.shellhan, p->text_title, FALSE);
    shell_Invalidate(familyinfo.shellhan, p->text_stts, FALSE);
    }

For the BN_CLICKED notification from the button, a shcmd_DATA_ACTION command is sent to the Logic module 102 for the public_TESTBTN Data 104 item:

case IDC_TESTBUTTON:
    // Notify Shell
    shcmd_Send(familyinfo.datahan[public_TESTBTN], shcmd_SRC_GUI, shcmd_DATA_ACTION, NULL, NULL);
    break;

The DataUpdate Function

The DataUpdate function is called in response to the shcmd_DATA_UPDATE command that is sent to the Logic 102 or the GUI 106 to indicate that some Data 104 has changed:

```
static BOOL DataUpdate(family_INFO *pfamilyinfo,
data_INFO *pdatainfo)
{
  BOOL      rv = FALSE;
  MYOBJ     *p = pfamilyinfo->pgui;
  data_HANDLE  datahan = pdatainfo ? pdatainfo->datahan : NULL;
  if (pfamilyinfo == NULL)
  {
    // DataInit( ) - pfamilyinfo cannot be NULL
  }
  else if (datahan == NULL)
  {
    // DataInit( ) - Invalid Data handle object
  }
  else
  {
    UINT32 r1, r2, r3;
    switch(pdatainfo->id)
    {
    case public_MYTEXT:
      SetDlgItemText(p->hWnd, IDC_MYTEXT, data_Get(datahan,
0, NULL));
      break;
    case public_METER:
      // Invalidate features that relate to the state of this value
      shell_Invalidate(pfamilyinfo->shellhan, p->trk_title, FALSE);
      shell_Invalidate(pfamilyinfo->shellhan, p->trk_stts, FALSE);
      break;
    case public_COUNTER:
      SetDlgItemInt(p->hWnd, IDC_VALUE, data_GetVal32(datahan, 0,
NULL), FALSE);
      // Invalidate features that relate to the state of this value
      shell_Invalidate(pfamilyinfo->shellhan, p->val_title, FALSE);
      shell_Invalidate(pfamilyinfo->shellhan, p->val_stts, FALSE);
      break;
    case public_ONETWOTHREE:
      // Check appropriate box
      r1 = r2 = r3 = BST_UNCHECKED;
      switch(data_GetVal32(datahan, 0, NULL))
      {
      case 1:
        r1 = BST_CHECKED;
        break;
      case 2:
        r2 = BST_CHECKED;
        break;
      case 3:
        r3 = BST_CHECKED;
        break;
      }
      SendDlgItemMessage(p->hWnd, IDC_RADIO_ONE,
BM_SETCHECK, r1, 0);
      SendDlgItemMessage(p->hWnd, IDC_RADIO_TWO,
BM_SETCHECK, r2, 0);
      SendDlgItemMessage(p->hWnd, IDC_RADIO_THREE,
BM_SETCHECK, r3, 0);
      break;
    }
    rv = TRUE;
  }
  return rv;
}
```

If the Data 104 item was the public_MYTEXT item, the content of the edit box is set to this text. This gives the Logic module 102 a chance to perform some validation; if the text entered into the edit box was invalid in some way, the Logic module 102 can simply ignore the offending change by setting the text to its previous value. This appears as though the edit box has simply ignored the last change.

case public_MYTEXT:
  SetDlgItemText(p→hWnd, IDC_MYTEXT, data_Get (datahan, 0, NULL));
  break;

For the public_METER Data 104 item notification, multiple Shell items are updated (invalidated).

case public_METER:
  // Invalidate features that relate to the state of this value
  shell_Invalidate(pfamilyinfo→shellhan, p→trk_title, FALSE);
  shell_Invalidate(pfamilyinfo→shellhan, p→trk_stts, FALSE);
  break;

It bears noting that the public_METER Data 104 item was also bound to a meter control in the "The DataInit Function" function; this control will also update public_METER Data object's bound control display without requiring any additional action.

For the public_COUNTER Data 104 item, the contents of the IDC_VALUE control (which is just a bare static control defined by the dialog template) are updated through a call to the Windows SetDlgItemInt function, then invalidate the two Shell features (a title and a status bar feature) so that they are redrawn with the new value.

case public_COUNTER:
  SetDlgItemInt(p→hWnd, IDC_VALUE, data_GetVal32 (datahan, 0, NULL), FALSE);
  // Invalidate features that relate to the state of this value
  shell_Invalidate(pfamilyinfo→shellhan, p→val_title, FALSE);
  shell_Invalidate(pfamilyinfo→shellhan, p→val_stts, FALSE);
  break;

For the public_ONETWOTHREE Data 104 item, the inventors of the present invention have opted to display this tri-state value through the use of three radio buttons defined in the dialog template (IDC_RADIO_ONE, IDC_RADIO_TWO, and IDC_RADIO_THREE). Based on the value of this Data 104 item, the check state is set on the radio button that corresponds to the current value while clearing the check state of the others:

case public_ONETWOTHREE:
  // Check appropriate box
  r1=r2=r3=BST_UNCHECKED;
  switch(data_GetVal32(datahan, 0, NULL))
  {
  case 1:
    r1=BST_CHECKED;
    break;
  case 2:
    r2=BST_CHECKED;
    break;
  case 3:
    r3=BST_CHECKED;
    break;
  }
  SendDlgItemMessage(p→hWnd, IDC_RADIO_ONE, BM_SETCHECK, r1, 0);
  SendDlgItemMessage(p→hWnd, IDC_RADIO_TWO, BM_SETCHECK, r2, 0);
  Send DlgItemMessage(p→hWnd, IDC_RADIO_THREE, BM_SETCHECK, r3, 0);
  break;

The DestroyFamily Function

This DestroyFamily function will be called in response to the shcmd_FAMILY_KILL command, which will be received when the family is about to be destroyed. It is here that any resources claimed in the course of execution will be freed. The demonstration will destroy the Shell features created in FamilyCreate, destroy the dialog window, and unregister the dialog window with the Shell 100:

```
static void DestroyFamily(family_INFO *pfamilyinfo)
{
if (pfamilyinfo)
{
MYOBJ *p=pfamilyinfo→pgui;
feature_Destroy(p→text_title);
feature_Destroy(p→trk_title);
feature_Destroy(p→val_title);
feature_Destroy(p→text_stts);
feature_Destroy(p→trk_stts);
feature_Destroy(p→val_stts);
if (IsWindow(p→hWnd))
{
DestroyWindow(p→hWnd);
if (shell_Valid(pfamilyinfo→shellhan) !=NULL)
{
// Remove from Shell if the Shell still exists
shell_RemovehWnd(pfamilyinfo→shellhan, p→hWnd);
// Remove Shell message manager}
}
```

If anything else (memory buffers, GDI or other windows handles, or anything that would need destruction) is allocated they would be destroyed here as well.

Miscellaneous

It should be noted that the present invention may be implemented using one or more software programs or using a plurality of modules of a single software program. Aspects of the present invention may also be implemented using other means for directing a processor (e.g. firmware). It should be noted that the term "computer" is meant to include any processing device including, but not limited to a personal computer, a laptop computer, a server, a smart phone, a personal data assistant (PDA), or a hybrid device.

Source Code

AppendixA.txt is a source code for an exemplary program as described above, which contains the following software components: cmdproc.c, cmdproc.h, ctl.c, ctl.h, data.c, data.h, family.c, family.h, feature.c, feature.h, shcmd.c, shcmd.h, shell.c, and shell.h. These software components are included on the two identical CDs that are submitted with this application, and this material on the CDs is incorporated into this specification by reference.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A non-transitory computer-readable medium containing instructions configured to direct a processor to:
   (a) operate a Shell Framework comprising a programming interface and an infrastructure to act as an intermediary between separate computer programming constructs;
   (b) operate said Shell Framework comprising said programming interface to communicate bi-directionally with at least one Logic construct, said at least one Logic construct is separate from said Shell Framework;
   (c) operate said Shell Framework comprising said programming interface to accept notification messages pertaining to at least one Data construct from said at least one Logic construct;
   (d) operate said Shell Framework comprising said programming interface to communicate bi-directionally with at least one GUI construct, the at least one GUI construct is separate from said Shell Framework and said at least one Logic construct;
   (e) operate said Shell Framework comprising said programming interface to accept said notification messages pertaining to said at least one Data construct from said at least one GUI construct;
   (f) operate said Shell Framework to transmit said notification messages pertaining to said at least one Data construct to said at least one GUI construct or to said at least one Logic construct; and
   (g) wherein said Shell Framework enables said at least one Logic construct and said at least one GUI construct to communicate said notification messages pertaining to said at least one Data construct without said at least one Logic construct and said at least one GUI construct directly communicating said notification messages with each other.

2. The non-transitory computer-readable medium of claim 1, further comprising at least one External (Ext) construct, said Shell Framework communicating bi-directionally with said at least one External (Ext) construct, the at least one External (Ext) construct separate from said Shell Framework, said at least one Logic construct, and said at least one GUI construct.

3. The non-transitory computer-readable medium of claim 1, wherein said at least one Data construct is modified directly by said at least one Logic construct, and said Shell Framework comprising said programming interface is sent a notification message pertaining to said modification of said at least one Data construct.

4. The non-transitory computer-readable medium of claim 1, wherein said at least one Data construct is modified indirectly, by either said at least one Logic construct or said at least one GUI construct, by sending a message to said Shell Framework comprising said programming interface requesting that said Shell Framework modify said at least one Data construct.

5. A computer-implemented method for programming comprising the steps of:
   (a) providing a programming interface and an infrastructure comprising:
      (i) at least one Shell construct;
      (ii) at least one Data construct;
      (iii) at least one I/O construct, said at least one I/O construct is at least one GUI construct;
      (iv) at least one Logic construct, said at least one Logic construct being independent from said at least one I/O construct; and
      (v) said at least one Shell construct is independent from said at least one I/O construct and said at least one Logic construct;
   (b) communicating between said at least one Shell construct and said at least one Logic construct bi-directionally;
   (c) communicating between said at least one Shell construct and said at least one I/O construct bi-directionally;
   (d) transmitting notification messages pertaining to said at least one Data construct from said at least one Shell construct to said at least one Logic construct when said at least one Data construct is accessed by said at least one I/O construct;
   (e) transmitting said notification messages pertaining to said at least one Data construct from said at least one Shell construct to said at least one I/O construct when said at least one Data construct is accessed by said at least one Logic construct; and
   (f) wherein said at least one Shell construct enables said at least one Logic construct and said at least one GUI construct to communicate said notification messages pertaining to said at least one Data construct without said at least one Logic construct and said at least one GUI construct directly communicating said notification messages with each other.

6. The computer-implemented method for programming of claim 5 further comprising the step of transmitting said notification messages pertaining to said at least one Data construct from said at least one Shell construct to said at least one Logic construct when said at least one Data construct is modified by said at least one I/O construct.

7. The computer-implemented method for programming of claim 5 further comprising the step of transmitting said notification messages pertaining to said at least one Data construct from said at least one Shell construct to said at least one I/O construct when said at least one Data construct is modified by said at least one Logic construct.

8. A programming system comprising;
a processor; and
a computer-readable medium comprising:
(a) a programming interface and an infrastructure comprising:
  (i) at least one Shell construct;
  (ii) at least one Data construct;
  (iii) at least one I/O construct, said at least one I/O construct is at least one GUI construct;
  (iv) at least one Logic construct, said at least one Logic construct being independent from said at least one I/O construct; and
  (v) said at least one Shell construct is independent from said at least one I/O construct and said at least one Logic construct;
(b) instructions for directing the processor to:
  (i) communicate between said at least one Shell construct and said at least one Logic construct bi-directionally;
  (ii) communicate between said at least one Shell construct and said at least one I/O construct bi-directionally;
  (iii) transmit notification messages pertaining to said at least one Data construct from said at least one Shell construct to said at least one Logic construct when said at least one Data construct is accessed by said at least one I/O construct; and
  (iv) transmit the notification messages pertaining to said at least one Data construct from said at least one Shell construct to said at least one I/O construct when said at least one Data construct is accessed by said at least one Logic construct; and
(c) wherein said at least one Shell construct enables said at least one Logic construct and said at least one I/O construct to communicate said notification messages pertaining to said at least one Data construct without said at least one Logic construct and said at least one I/O construct directly communicating said notification messages with each other.

9. The programming system of claim 8, further comprising the instructions for directing the processor to transmit the notification messages pertaining to said at least one Data construct from said at least one Shell construct to said at least one Logic construct when said at least one Data construct is modified by said at least one I/O construct.

10. The programming system of claim 8, further comprising the instructions for directing the processor to transmit the notification messages pertaining to said at least one Data construct from said at least one Shell construct to said at least one I/O construct when said at least one Data construct is modified by said at least one Logic construct.

* * * * *